(12) United States Patent
Kodama et al.

(10) Patent No.: US 10,871,986 B2
(45) Date of Patent: Dec. 22, 2020

(54) VIRTUAL SERVER MIGRATION AFTER PERFORMANCE DETERIORATION

(71) Applicant: FUJITSU LIMITED, Kawasaki (JP)

(72) Inventors: Hiroyoshi Kodama, Isehara (JP); Shigeto Suzuki, Kawasaki (JP); Hiroyuki Fukuda, Yokohama (JP); Kazumi Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 16/427,815

(22) Filed: May 31, 2019

(65) Prior Publication Data
US 2020/0012516 A1    Jan. 9, 2020

(30) Foreign Application Priority Data

Jul. 3, 2018 (JP) .................................. 2018-127170

(51) Int. Cl.
*G06F 9/48* (2006.01)
*G06F 9/50* (2006.01)

(52) U.S. Cl.
CPC .......... *G06F 9/4856* (2013.01); *G06F 9/5077* (2013.01); *G06F 9/5088* (2013.01)

(58) Field of Classification Search
CPC ..... G06F 9/4856; G06F 9/5088; G06F 9/5077
See application file for complete search history.

(56) References Cited

U.S. PATENT DOCUMENTS

| 8,060,610 B1 * | 11/2011 | Herington ............. G06F 9/5077 709/226 |
| 9,858,095 B2 * | 1/2018 | Breitgand ........... G06F 9/45533 |
| 10,789,102 B2 * | 9/2020 | Chen ...................... H04L 47/70 |

(Continued)

FOREIGN PATENT DOCUMENTS

| JP | 2009-116852 | 5/2009 |
| WO | 2010/140183 | 12/2010 |

OTHER PUBLICATIONS

Hancong Duan et al., "Energy-aware scheduling of virtual machines in heterogeneous cloud computing systems", Future Generation Computer Systems, vol. 74, pp. 142-150, 2017 (9 pages).

(Continued)

*Primary Examiner* — Benjamin C Wu
(74) *Attorney, Agent, or Firm* — Fujitsu Patent Center

(57) ABSTRACT

A migration management method includes referring to a performance deterioration rate of a specific virtual server when utilization of a virtual server other than the specific virtual server in virtual servers that work on a physical server is changed in a stepwise manner, and calculating a first index value relating to a load state of the physical server before the performance deterioration rate exceeds a threshold based on a number of virtual CPUs allocated to each of the virtual servers and utilization of the virtual CPUs; calculating a second index value relating to the load state based on the number of virtual CPUs and the utilization while the specific virtual server is activated on the physical server; and conducting migration to another physical server for a virtual server other than the specific virtual server in the virtual servers when the calculated second index value exceeds the calculated first index value.

10 Claims, 16 Drawing Sheets

(56) References Cited

U.S. PATENT DOCUMENTS

| | | | | |
|---|---|---|---|---|
| 2002/0087611 A1* | 7/2002 | Tanaka | G06F 11/3433 | 718/1 |
| 2003/0158884 A1* | 8/2003 | Alford, Jr. | G06F 9/5061 | 718/104 |
| 2010/0070807 A1* | 3/2010 | Hamilton, II | G06F 11/0769 | 714/48 |
| 2011/0126206 A1* | 5/2011 | Kato | G06F 9/505 | 718/103 |
| 2011/0209146 A1* | 8/2011 | Box | G06F 9/4862 | 718/1 |
| 2011/0276982 A1* | 11/2011 | Nakayama | H04L 67/1029 | 718/105 |
| 2012/0066684 A1 | 3/2012 | Takami | | |
| 2012/0079226 A1* | 3/2012 | Kihara | G06F 3/0689 | 711/165 |
| 2013/0124722 A1* | 5/2013 | Wang | G06F 9/5077 | 709/224 |
| 2013/0346572 A1* | 12/2013 | Jain | G06F 9/5088 | 709/223 |
| 2013/0346615 A1* | 12/2013 | Gondi | G06F 9/5077 | 709/226 |
| 2014/0068608 A1* | 3/2014 | Kulkarni | G06F 9/5083 | 718/1 |
| 2014/0165063 A1* | 6/2014 | Shiva | G06F 9/45533 | 718/1 |
| 2014/0189441 A1* | 7/2014 | Ishida | G06F 11/3433 | 714/47.3 |
| 2014/0196041 A1* | 7/2014 | Takamura | G06F 9/5088 | 718/1 |
| 2015/0309828 A1* | 10/2015 | Shaik | G06F 9/5083 | 718/1 |
| 2015/0350055 A1* | 12/2015 | Hyser | G06F 9/5088 | 709/224 |
| 2016/0077846 A1* | 3/2016 | Phillips | G06Q 10/06 | 718/1 |
| 2017/0346760 A1* | 11/2017 | Kelly | H04L 67/1097 | |
| 2018/0113748 A1* | 4/2018 | Pagade | G06F 9/5077 | |
| 2018/0219899 A1* | 8/2018 | Joy | G06F 9/5027 | |
| 2019/0278626 A1* | 9/2019 | Kodama | G06F 1/3206 | |
| 2019/0294462 A1* | 9/2019 | Franciosi | G06F 9/45533 | |
| 2020/0104153 A1* | 4/2020 | Shibayama | G06F 9/5027 | |

OTHER PUBLICATIONS

Rafael Brundo Uriarte et al., "Service Clustering for Autonomic Clouds Using Random Forest", 15th IEEE/ACM International Symposium on Cluster, Cloud and Grid Computing, pp. 515-524, 2015 (10 pages).

Trung Hieu Nguyen et al., "Virtual Machine Consolidation with Multiple Usage Prediction for Energy-Efficient Cloud Data Centers" IEEE Transactions on Services Computing, pp. 1-14, Mar. 2016 (14 pages).

* cited by examiner

FIG. 8

RUNNING STATUS DB ~620

| HOST NAME | VIRTUAL SERVER NAME | FLAG | NUMBER OF vCPUs | CPU UTILIZATION (%) | TIME STAMP |
|---|---|---|---|---|---|
| PM1 | VM1-1 | 1 | 2 | 100 | 2018/06/18 09:00:00 |
|  | VM1-2 | 0 | 2 | 50 | 2018/06/18 09:00:00 |
|  | VM1-3 | 0 | 2 | 70 | 2018/06/18 09:00:00 |
|  | VM1-4 | 0 | 2 | 40 | 2018/06/18 09:00:00 |
|  | VM1-5 | 0 | 2 | 60 | 2018/06/18 09:00:00 |
|  | VM1-6 | 1 | 2 | 80 | 2018/06/18 09:00:00 |
|  | VM1-7 | 0 | 2 | 30 | 2018/06/18 09:00:00 |
|  | VM1-8 | 0 | 2 | 40 | 2018/06/18 09:00:00 |
|  | VM1-9 | 0 | 2 | 50 | 2018/06/18 09:00:00 |
|  | VM1-10 | 0 | 2 | 20 | 2018/06/18 09:00:00 |
| PM2 | VM2-1 | 0 | 2 | 50 | 2018/06/18 09:00:00 |
| ... | ... | ... | ... | ... | ... |

| HOST NAME | LOAD THRESHOLD |
|---|---|
| PM1 | L1 |
| PM2 | L2 |
| : | : |

LOAD THRESHOLD TABLE ~1100

(STATE X)

| HOST NAME | VIRTUAL SERVER NAME | FLAG | NUMBER OF vCPUs | CPU UTILIZATION (%) | nVM |
|---|---|---|---|---|---|
| PM1 | VM1-1 | 1 | 2 | 100 | 2 |
| | VM1-2 | 0 | 2 | 50 | 1 |
| | VM1-3 | 0 | 2 | 70 | 1.4 |
| | VM1-4 | 0 | 2 | 40 | 0.8 |
| | VM1-5 | 0 | 2 | 60 | 1.2 |
| | VM1-6 | 1 | 2 | 80 | 1.6 |
| | VM1-7 | 0 | 2 | 30 | 0.6 |
| | VM1-8 | 0 | 2 | 40 | 0.8 |
| | VM1-9 | 0 | 2 | 50 | 1 |
| | VM1-10 | 0 | 2 | 20 | 0.4 |
| | SUM | 2 | 20 | | 10.8 |

FIG. 13

(STATE Y: PREDICTION OF STATE AFTER ELAPSE OF TEN MINUTES FROM STATE X)

| HOST NAME | VIRTUAL SERVER NAME | FLAG | NUMBER OF vCPUs | CPU UTILIZATION (%) | nVM |
|---|---|---|---|---|---|
| PM1 | VM1-1 | 1 | 2 | 100 | 2 |
| | VM1-2 | 0 | 2 | 90 | 1.8 |
| | VM1-3 | 0 | 2 | 70 | 1.4 |
| | VM1-4 | 0 | 2 | 80 | 1.6 |
| | VM1-5 | 0 | 2 | 90 | 1.8 |
| | VM1-6 | 1 | 2 | 90 | 1.8 |
| | VM1-7 | 0 | 2 | 70 | 1.4 |
| | VM1-8 | 0 | 2 | 80 | 1.6 |
| | VM1-9 | 0 | 2 | 80 | 1.6 |
| | VM1-10 | 0 | 2 | 80 | 1.6 |
| | SUM | 2 | 20 | | 16.6 |

VIRTUAL SERVER MIGRATION AFTER PERFORMANCE DETERIORATION

CROSS-REFERENCE TO RELATED APPLICATION

This application is based upon and claims the benefit of priority of the prior Japanese Patent Application No. 2018-127170, filed on Jul. 3, 2018, the entire contents of which are incorporated herein by reference.

FIELD

The embodiments discussed herein are related to a migration management method, a migration system, and a storage medium.

BACKGROUND

In recent years, operation in which plural virtual servers are constructed on one physical server has been rapidly becoming popular along with improvement in the performance of the physical server. Allocation of computational resources such as a central processing unit (CPU) and a memory to the virtual servers caused to work on the physical server is decided by an administrator of an operating system who constructs a virtual environment, for example.

There is a technique in which a user may define a migration policy for optimization of the whole system and also a migration policy that depends on an application and, with consideration of both policies, moving a virtual machine on which the application runs to another server while keeping the virtual machine running is controlled. Japanese Laid-open Patent Publication No. 2009-116852 and so forth are disclosed, for example.

However, in carrying out load balancing between physical servers, migration of a virtual server whose performance is desired to be ensured occurs and performance deterioration of this virtual server is caused in some cases. In view of the above, it is desirable that a specific virtual server may be excluded from the migration target and the performance deterioration may be suppressed.

SUMMARY

According to an aspect of the embodiments, a migration management method executed by a computer, the migration management method includes referring to a performance deterioration rate of a specific virtual server when utilization of a virtual server other than the specific virtual server in virtual servers that work on a physical server is changed in a stepwise manner, and calculating a first index value relating to a load state of the physical server before the performance deterioration rate of the specific virtual server exceeds a threshold based on a number of virtual CPUs allocated to each of the virtual servers that work on the physical server and utilization of the virtual CPUs; calculating a second index value relating to the load state of the physical server based on the number of virtual CPUs allocated to each of the virtual servers that work on the physical server and the utilization of the virtual CPUs while the specific virtual server is activated on the physical server; and conducting migration to another physical server for a virtual server other than the specific virtual server in the virtual servers that work on the physical server when the calculated second index value exceeds the calculated first index value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory diagram illustrating one example of stored contents of a running status DB;

FIG. 11 is an explanatory diagram illustrating one example of stored contents of a load threshold table;

FIG. 12 is an explanatory diagram (first diagram) illustrating a prediction example of running status of virtual servers;

FIG. 13 is an explanatory diagram (second diagram) illustrating a prediction example of running status of virtual servers;

DESCRIPTION OF EMBODIMENTS

Embodiments of migration management program and migration method and system according to the present disclosure will be described in detail below with reference to the drawings.

Embodiments

Figure 1:
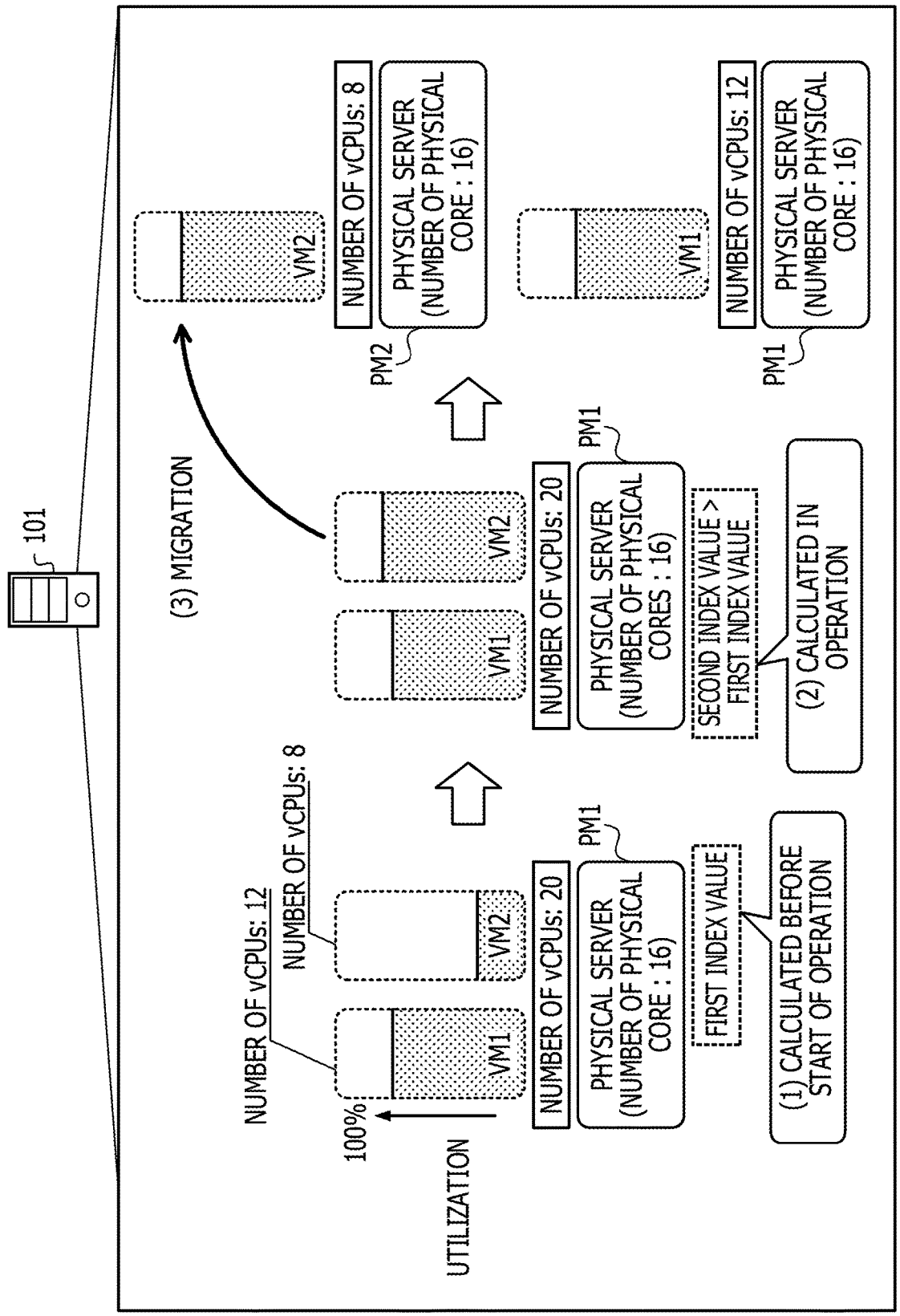
FIG. 1 is an explanatory diagram illustrating one embodiment example of a migration method according to an embodiment.

FIG. 1 is an explanatory diagram illustrating one embodiment example of a migration method according to an embodiment. In FIG. 1, information processing apparatus 101 is a computer that controls migration of a virtual server between physical servers. A physical server is a computer that virtualizes hardware resources of the self-apparatus and may execute plural different operating systems (OS). The hardware resources of the self-apparatus are CPU, memory, interface (I/F), and so forth, for example.

For example, the physical server may run an OS by a virtual server that works in an execution environment constructed by dividing the hardware resources of the self-apparatus. The virtual server is a virtual computer that works in an execution environment constructed by dividing hardware resources of a physical computer. The migration refers to transfer of a virtual server that is working on a physical server to another physical server.

Here, it is important to operate as many virtual servers as possible by as few physical servers as possible in order to effectively utilize computational resources. For example, in carrying out a service of offering virtual servers, operating as many virtual servers as possible by as few physical servers as possible leads to maximization of the profit.

As a measure to effectively utilize computational resources, there is load balancing by migration between physical servers. The load balancing by migration is a technique desirable for total optimization. For example, the running status of virtual servers is monitored and, when it is determined that the load on the physical server is large, the load balancing is carried out by moving a virtual server to another physical server.

There is a technique in which, in this case, a virtual server with a relatively-large load in the virtual servers that work on a physical server is deemed as the migration target in terms of efficiently carrying out the load balancing. However, in this technique, migration based on intention of the operator (service provider) is difficult. In addition, intention of the user of the virtual server (service user) is also not reflected.

For example, even when there is a virtual server that is not desired to be subjected to migration by the user or operator, it is difficult to reflect the intention. Meanwhile, in moving a virtual server, the performance of the virtual server lowers due to the migration in some cases. For this reason, the difficulty in selecting the virtual server excluded from the migration target according to operator's or user's convenience or the like possibly causes the lowering of usability.

Thus, in the present embodiment, a description will be made about a migration method in which, in carrying out load balancing by migration, a specific virtual server is excluded from the migration target according to operator's or user's convenience or the like and performance deterioration of the specific virtual server is suppressed.

A processing example of the information processing apparatus 101 will be described below. In kinds of processing of the following (1) to (3), processing of the following (1) is executed before start of operation of a physical server, for example, before start of use of a virtual server by a user, for example. The kinds of processing of the following (2) and (3) are carried out while the physical server is operated, for example, while the virtual server is used by the user.

(1) The information processing apparatus 101 calculates a first index value relating to the load state of the physical server before the performance deterioration rate of a specific virtual server in the virtual servers that work on the physical server exceeds a threshold α. Here, the specific virtual server is a virtual server excluded from the migration target and may be arbitrarily specified. As the specific virtual server, a virtual server about which service level agreement (SLA) is made is specified, for example.

The performance deterioration rate of the virtual server represents the degree of deterioration with respect to the absolute performance of the virtual server. The absolute performance of the virtual server is performance obtained when the virtual server is solely activated in the physical server or when the other virtual servers are all in an idle state. The threshold α may be arbitrarily set and represents what degree of performance deterioration with respect to the absolute performance is permitted. For example, when the threshold α is set to "α=10%," this means that performance deterioration of up to 10% with respect to the absolute performance is permitted.

The index value relating to the load state of the physical server is an index that represents what degree of load is applied to the physical server. The index value relating to the load state of the physical server may be calculated based on the number of virtual CPUs allocated to each virtual server that works on the physical server and the utilization of the virtual CPUs.

Specifically, for example, first the information processing apparatus 101 identifies the performance deterioration rate of a specific virtual server when the utilization of the virtual server other than the specific virtual server in the virtual servers that work on the physical server is changed in a stepwise manner. However, the case is assumed in which the physical server is in a so-called overcommit state in which the total number of virtual CPUs allocated to the virtual servers that work on the physical server exceeds the number of physical cores (CPU cores) which the physical server has.

In the example of FIG. 1, the case in which virtual servers VM1 and VM2 are operated on a physical server PM1 is assumed. Here, suppose that the number of physical cores which the physical server PM1 has is "16." Suppose that the number of virtual CPUs allocated to the virtual server VM1 is "12" and the number of virtual CPUs allocated to the virtual server VM2 is "8."

Suppose that the specific virtual server excluded from the migration target is the virtual server VM1. In this case, the information processing apparatus 101 identifies the performance deterioration rate of the virtual server VM1 when the utilization of the virtual server other than the virtual server VM1 in the virtual servers that work on the physical server VM1 is changed in a stepwise manner.

In identifying the performance deterioration rate of the virtual server VM1, the virtual server caused to work on the physical server PM1 may be a virtual server different from that at the time of operation. However, it is preferable that the number of virtual servers caused to work on the physical server PM1, the number of virtual servers excluded from the migration target, and the number of virtual CPUs allocated to each virtual server be the same as those at the time of operation.

More specifically, for example, the information processing apparatus 101 actually activates the virtual servers VM1 and VM2 on the physical server PM1 and measures the performance value of the virtual server VM1 when the utilization of the virtual server VM2 is raised in a stepwise manner. On this occasion, the utilization of the virtual server VM1 may be fixed.

The information processing apparatus 101 measures the absolute performance of the virtual server VM1. The absolute performance of the virtual server VM1 is the performance value of the virtual server VM1 obtained when the virtual server VM1 is solely activated or when the other virtual servers are all in an idle state in the physical server PM1.

Then, the information processing apparatus 101 identifies the performance deterioration rate of the virtual server VM1 by calculating the ratio of the measured performance value of the virtual server VM1 to the measured absolute performance of the virtual server VM1. This may identify the performance deterioration rate of the virtual server VM1 when the utilization of the virtual server VM2 is raised in a stepwise manner.

The performance deterioration rate of the virtual server VM1 when the utilization of the virtual server VM2 is raised in a stepwise manner will be described later by using FIG. 2 and FIG. 3.

Next, with reference to the identified performance deterioration rate of the virtual server VM1, the information processing apparatus 101 calculates the first index value relating to the load state of the physical server PM1 before the performance deterioration rate of the virtual server VM1 exceeds the threshold α. When the threshold α is set to "α=10%," the information processing apparatus 101 calculates the first index value relating to the load state of the physical server PM1 before the performance deterioration rate of the virtual server VM1 exceeds 10%.

Here, the first index value represents the load state of the physical server PM1 with which it may be said that the performance deterioration rate of the virtual server VM1 exceeds the threshold α when any further load is applied to the physical server PM1. For example, the excess over the first index value by the index value relating to the load state of the physical server PM1 may be interpreted as a sign of lowering of the performance of the virtual server VM1 beyond the allowable range.

More specifically, for example, the information processing apparatus 101 identifies state change when the performance deterioration rate of the virtual server VM1 exceeds the threshold α in plural states obtained by changing the utilization of the virtual server VM2 in a stepwise manner. Then, the information processing apparatus 101 calculates the index value relating to the load state of the physical server PM1 in the state immediately before excess over the threshold α as the first index value.

On this occasion, as the index value relating to the load state of the physical server PM1, the information processing apparatus 101 may calculate the actual total number of virtual CPUs by using the following expression (1), for example. In expression (1), n is the number of virtual CPUs (the number of vCPUs) allocated to the virtual server. N is the number of virtual servers that work on the physical server. $VM_{CPUutil}$ is the CPU utilization of the virtual server. $VM_{CPUutil}$ is represented by ratio, not percentage. i is "i=1, 2, . . . , N."

$$\text{The actual total number of virtual CPUs} = \Sigma n VM_{iPUutil} = (n_1 * VM_{1CPUutil} + n_2 * VM_{2CPUutil} + \ldots + n_N * VM_{NCPUutil}) \quad (1)$$

$nVM_{CPUutil}$ is the value that represents the actual utilization of the virtual server by the product of the number of vCPUs and the CPU utilization in consideration of the fact that the number of virtual CPUs allocated to the virtual server differs in some cases. Therefore, it may be said that the actual total number of virtual CPUs obtained by the above expression (1) represents the actual load applied to the physical server. When the actual total number of virtual CPUs exceeds the number of physical cores which the physical server has, this means that a waiting time due to CPU insufficiency occurs and the performance of the virtual servers that work on the physical server lowers.

The information processing apparatus 101 may calculate the value obtained by subtracting the nVM value ($nVM_{CPUutil}$) of the specific virtual server excluded from the migration target from the actual total number of virtual CPUs as the index value relating to the load state of the physical server. In this case, the calculated index value represents how much load of the physical server is applied for execution of the virtual servers other than the specific virtual server.

(2) The information processing apparatus 101 calculates a second index value relating to the load state of the physical server based on the number of virtual CPUs allocated to each virtual server that works on the physical server and the utilization of the virtual CPUs while the specific virtual server is activated on the physical server. For example, the information processing apparatus 101 calculates the index value that represents what degree of load is applied to the physical server while the specific virtual server is operated.

In the example of FIG. 1, the information processing apparatus 101 occasionally calculates the second index value relating to the load state of the physical server PM1 based on the number of virtual CPUs allocated to each of the virtual servers VM1 and VM2 that work on the physical server PM1 and the utilization of the virtual CPUs. Specifically, for example, the information processing apparatus 101 occasionally calculates the actual total number of virtual CPUs by using the above expression (1) as the second index value relating to the load state of the physical server PM1.

(3) When the calculated second index value exceeds the calculated first index value, the information processing apparatus 101 carries out migration to another physical server for a virtual server other than the specific virtual server in the virtual servers that work on the physical server.

Here, it may be said that the state in which the second index value exceeds the first index value is the state in which the possibility that the performance of the specific virtual server deteriorates beyond the allowable range is high. For this reason, the information processing apparatus 101 carries out migration to another physical server for a virtual server other than the specific virtual server in response to the excess over the first index value by the second index value.

In the example of FIG. 1, when the second index value (the actual total number of virtual CPUs) exceeds the first index value (the actual total number of virtual CPUs), the information processing apparatus 101 carries out migration to another physical server PM2 for the virtual server VM2 other than the virtual server VM1 in the virtual servers VM1 and VM2 that work on the physical server PM1.

This may suppress performance deterioration of the virtual server VM1 through the migration of the virtual server VM2 to another physical server PM2 at a timing before the performance of the virtual server VM1 deteriorates to an unacceptable degree. Furthermore, total optimization may be intended by load balancing by the migration between the physical servers PM1 and PM2.

Here, the performance deterioration rate of the virtual server VM1 when the utilization of the virtual server VM2 is raised in a stepwise manner will be described by using FIG. 2 and FIG. 3.

Figure 2:
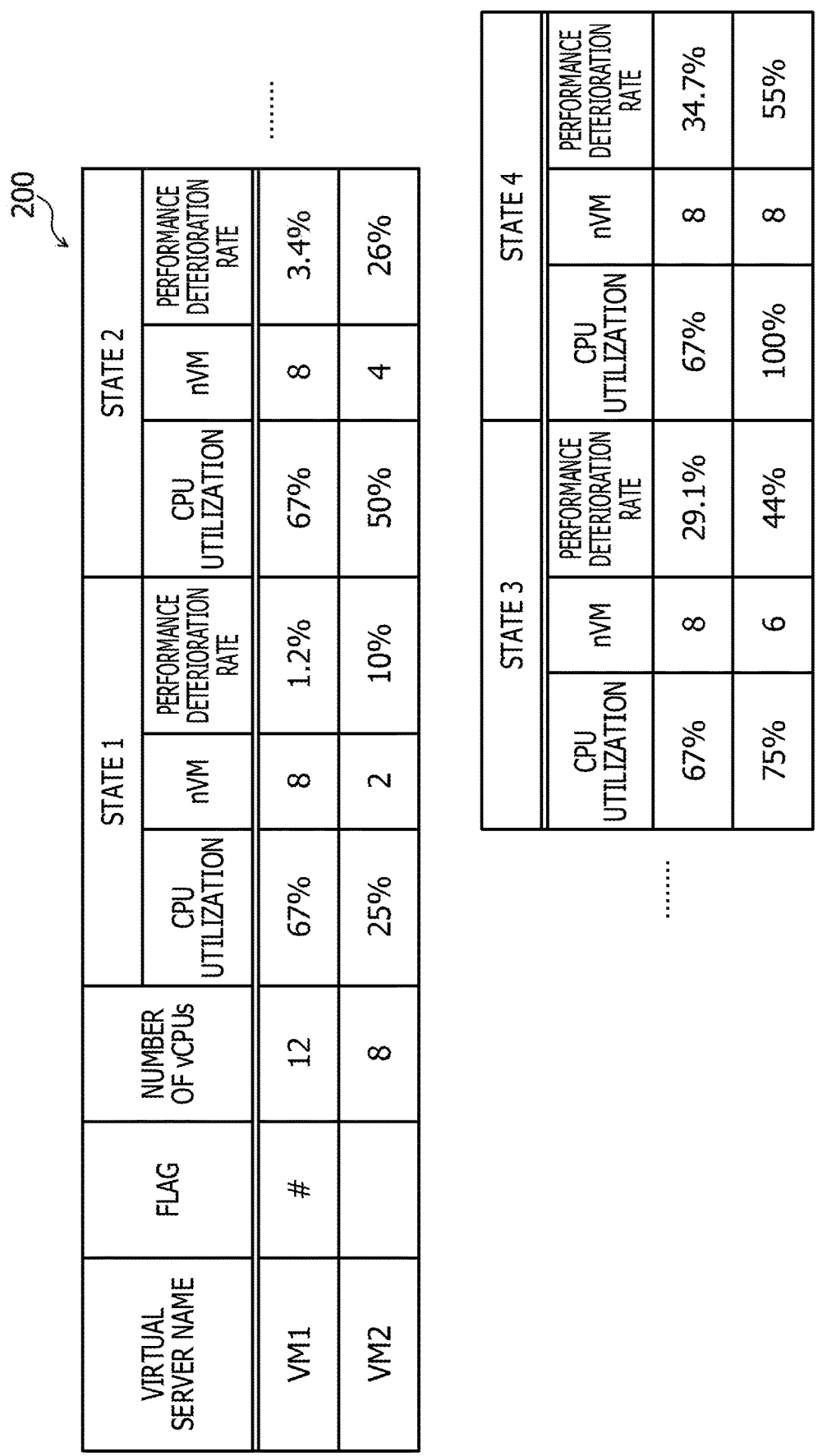
FIG. 2 is an explanatory diagram (first diagram) illustrating time-series change in running status of virtual servers.

FIG. 2 is an explanatory diagram (first diagram) illustrating time-series change in running status of virtual servers. FIG. 3 is an explanatory diagram (first diagram) illustrating time-series change in a performance value of virtual servers. In FIG. 2, an experimental result 200 represents the running status (states 1 to 4) of the virtual servers VM1 and VM2 when the utilization of the virtual server VM2 in the virtual servers VM1 and VM2 that work on the physical server PM1 is raised in a stepwise manner.

A flag "#" represents that the corresponding virtual server is the specific virtual server excluded from the migration target. The number of vCPUs is the number of virtual CPUs allocated to the virtual server VM1 or VM2. For example, the maximum performance of one virtual CPU is equivalent to the maximum performance of one physical core which the physical server PM1 has. Here, the physical server PM1 is in the overcommit state in which the total number "20" of virtual CPUs allocated to the virtual servers VM1 and VM2 exceeds the number "16" of physical cores.

The CPU utilization is the utilization of the virtual CPUs allocated to the virtual server. nVM is the value that represents the actual utilization of the virtual server by the product of the number of vCPUs and the CPU utilization. The performance deterioration rate represents the degree of deterioration with respect to the absolute performance of the virtual server.

Here, state 1 is the state in which the CPU utilization of the virtual server VM1 is "67%" and the CPU utilization of the virtual server VM2 is "25%." State 2 is the state in which the CPU utilization of the virtual server VM1 is "67%" and the CPU utilization of the virtual server VM2 is "50%." State 3 is the state in which the CPU utilization of the virtual server VM1 is "67%" and the CPU utilization of the virtual server VM2 is "75%." State 4 is the state in which the CPU utilization of the virtual server VM1 is "67%" and the CPU utilization of the virtual server VM2 is "100%."

Figure 3:
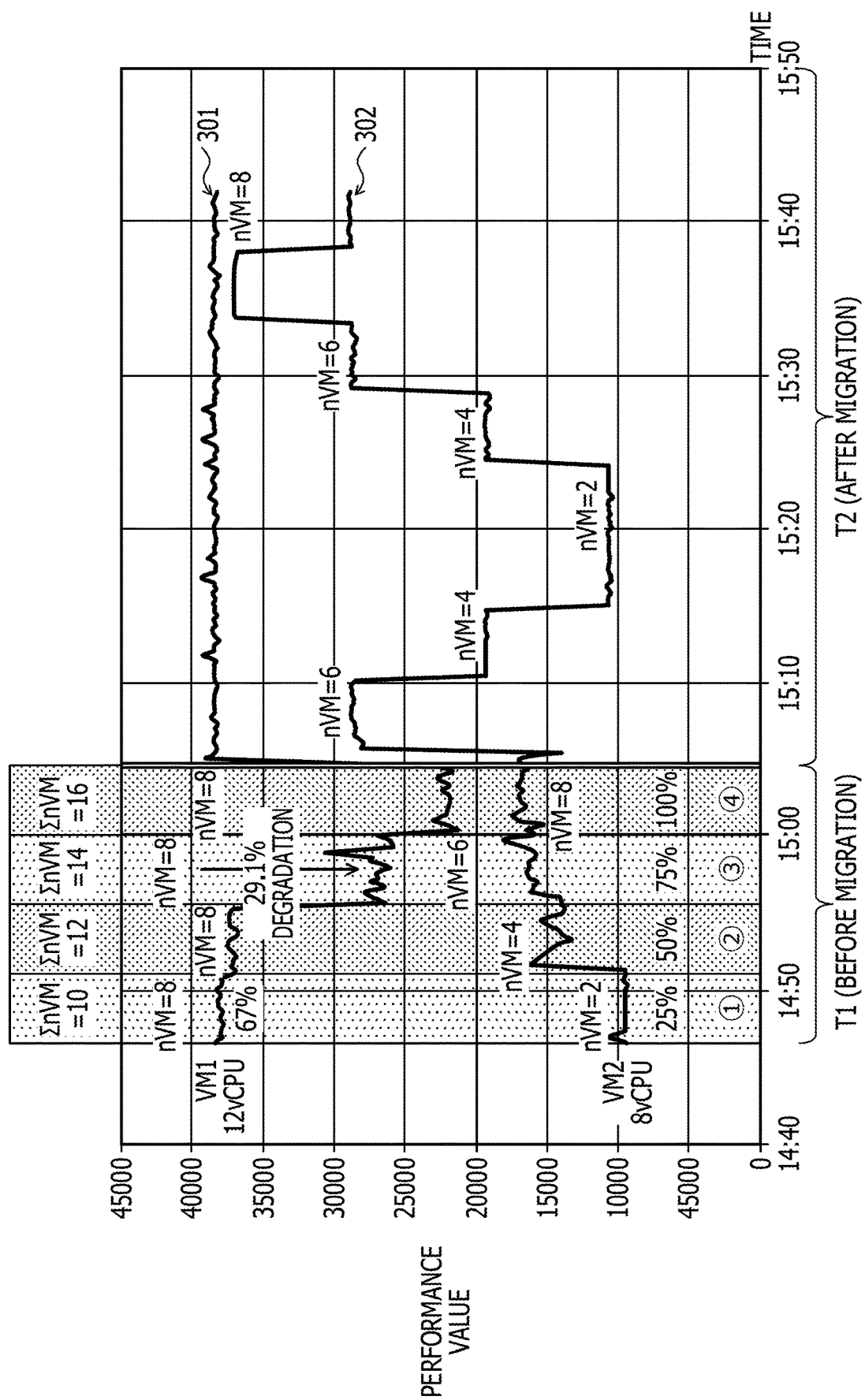
FIG. 3 is an explanatory diagram (first diagram) illustrating time-series change in a performance value of virtual servers.

In FIG. 3, a graph 301 represents time-series change in the performance value of the virtual server VM1. A graph 302 represents time-series change in the performance value of the virtual server VM2. The performance value represents that the performance of the virtual server is higher when the value is higher. The performance value of the respective virtual servers VM1 and VM2 may be measured by using an existing benchmark.

In FIG. 3, a period T1 represents a period in which the virtual servers VM1 and VM2 work on the same physical server PM1. Circled numbers 1 to 4 correspond to the periods of states 1 to 4. A period T2 represents a period in which migration of the virtual server VM2 from the physical server PM1 to the physical server PM2 is carried out and the virtual server VM1 works on the physical server PM1 and the virtual server VM2 works on the physical server PM2.

According to the graph 301, it turns out that, in the period T1, the performance value of the virtual server VM1 lowers as the CPU utilization of the virtual server VM2 rises. Furthermore, in the period T2, the performance value (absolute performance) when the virtual server VM1 is solely activated on the physical server PM1 may be identified.

According to the graph 302, it turns out that, in the period T1, the performance value of the virtual server VM2 rises as the CPU utilization of the virtual server VM2 rises. Furthermore, in the period T2, the performance value (absolute performance) when the virtual server VM2 is solely activated while the CPU utilization is changed on the physical server PM2 may be identified.

Here, in the period T1, there is a point at which the performance value of the virtual server VM1 rapidly lowers as the CPU utilization of the virtual server VM2 rises. For example, when the state changes from state 1 to state 2, the performance value of the virtual server VM1 lowers but does not rapidly lower.

On the other hand, when the state changes from state 2 to state 3, the performance value of the virtual server VM1 rapidly lowers and the performance deterioration rate becomes "29.1%." The performance deterioration rate is represented by the ratio of the performance value of the virtual server VM1 to the absolute performance thereof, for example "(performance value of virtual server/absolute performance of virtual server)×100."

As above, it turns out that the performance value of a certain virtual server does not linearly change in response to the rise in the utilization of another virtual server under an environment in which plural virtual servers coexist on a physical server. For example, the point at which the performance value of the specific virtual server rapidly lowers may be identified by changing, in a stepwise manner, the utilization of the virtual server other than the specific virtual server in the virtual servers that work on the physical server.

For example, suppose that the threshold α relating to the performance deterioration rate of the virtual server VM1 is "α=10%." For example, suppose that performance deterioration of up to 10% with respect to the absolute performance of the virtual server VM1 is permitted. In the example of FIG. 2 and FIG. 3, the performance deterioration rate of the virtual server VM1 of the respective states 1 to 4 changes in order of "1.2%→3.4%→29.1%→34.7%."

In this case, when a transition is made from state 2 to state 3, the performance value of the virtual server VM1 rapidly lowers and the performance deterioration rate becomes "29.1%" and exceeds the threshold α. Thus, the information processing apparatus 101 identifies state 2 in states 1 to 4 as the state before the performance deterioration rate of the virtual server VM1 exceeds the threshold α.

Then, the information processing apparatus 101 calculates the index value relating to the load state of the physical server PM1 in state 2 as the first index value. Specifically, for example, the information processing apparatus 101 calculates the actual total number of virtual CPUs as the index value relating to the load state of the physical server PM1 by using the above-described expression (1).

In the example of FIG. 2, the actual total number of virtual CPUs of the physical server PM1 in state 2 is "12 (=8+4)." Thus, the first index value is "12."

However, as the index value relating to the load state of the physical server, the value obtained by subtracting the nVM value ($nVM_{CPUutil}$) of the specific virtual server excluded from the migration target from the actual total number of virtual CPUs may be calculated. In this case, the first index value relating to the load state of the physical server PM1 in state 2 is "4," which is the value obtained by subtracting the nVM value "8" of the virtual server VM1 from the actual total number "12" of virtual CPUs of the physical server PM1 in state 2.

When the virtual server VM2 in the virtual servers VM1 and VM2 is employed as the specific virtual server excluded from the migration target, the information processing apparatus 101 changes the utilization of the virtual server VM1 in a stepwise manner and identifies time-series change in the performance value of the virtual server VM2.

Here, the performance deterioration rate of the virtual server VM2 when the utilization of the virtual server VM1 is raised in a stepwise manner will be described by using FIG. 4 and FIG. 5. However, here part of the experimental result 200 illustrated in FIG. 2 (states 1 and 2) is diverted to describe the performance deterioration rate of the virtual server VM2.

Figure 4:
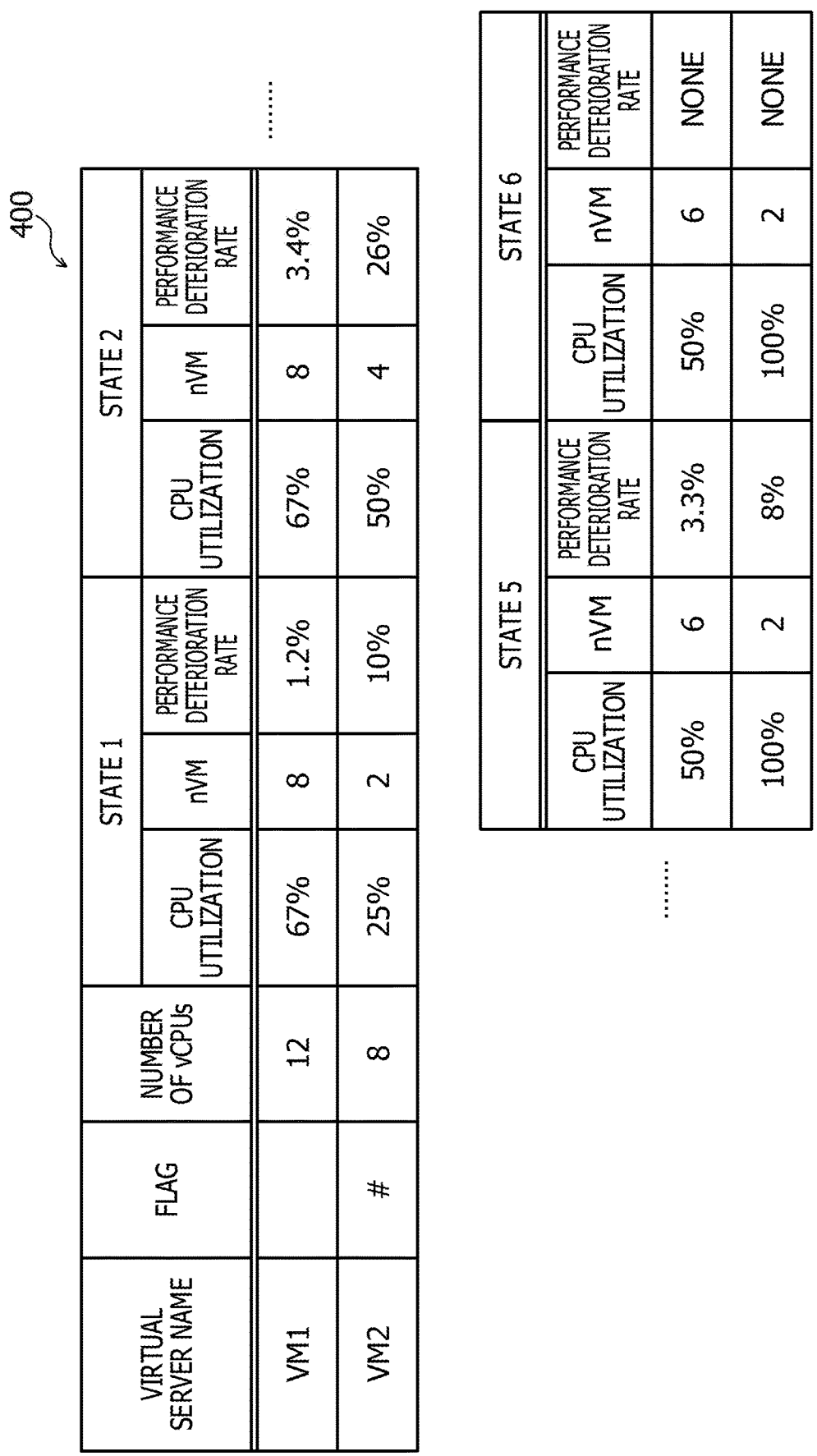
FIG. 4 is an explanatory diagram (second diagram) illustrating time-series change in running status of virtual servers.

FIG. 4 is an explanatory diagram (second diagram) illustrating time-series change in running status of virtual servers. FIG. 5 is an explanatory diagram (second diagram) illustrating time-series change in a performance value of virtual servers. In FIG. 4, an experimental result 400 represents the running status of the virtual servers VM1 and VM2 when the utilization of the virtual server VM1 is changed in a stepwise manner. Here, the case is assumed in which the running status of the virtual servers VM1 and VM2 makes a transition to states 5 and 6 after states 1 and 2.

Figure 5:
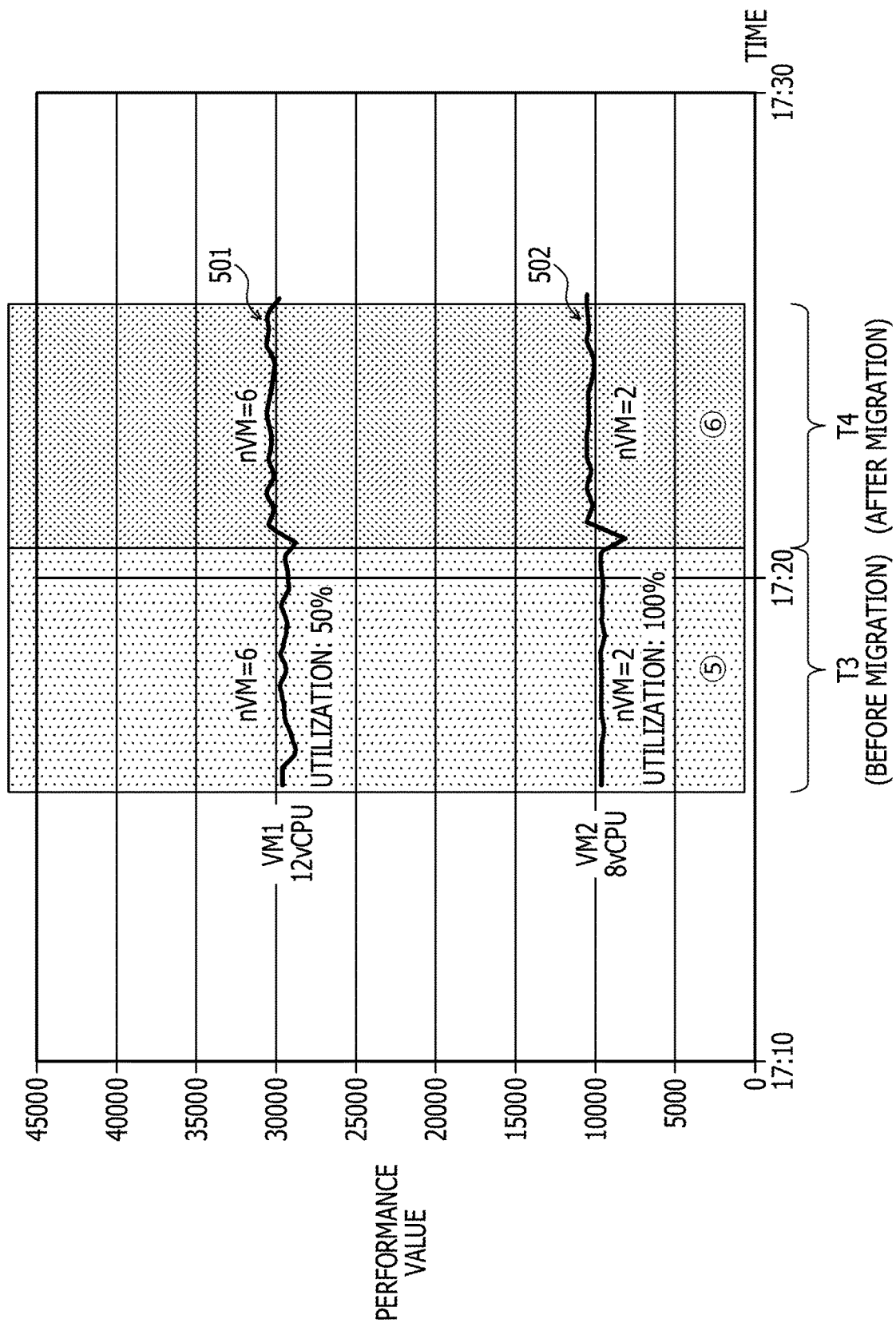
FIG. 5 is an explanatory diagram (second diagram) illustrating time-series change in a performance value of virtual servers.

In FIG. 5, a graph 501 represents time-series change in the performance value of the virtual server VM1. A graph 502 represents time-series change in the performance value of the virtual server VM2. In FIG. 5, a period T3 represents a period in which the virtual servers VM1 and VM2 work on the same physical server PM1. A period T4 represents a period in which migration of the virtual server VM2 from the physical server PM1 to the physical server PM2 is carried out and the virtual server VM1 works on the physical server PM1 and the virtual server VM2 works on the physical server PM2. Circled numbers 5 and 6 correspond to the periods of states 5 and 6.

Here, suppose that the threshold α relating to the performance deterioration rate of the virtual server VM2 is "10%." In the example of FIG. 4 and FIG. 5, the performance deterioration rate of the virtual server VM2 in state 5 is "8%." Furthermore, the performance deterioration rate of the virtual server VM2 in state 1 is "10%." Thus, the information processing apparatus 101 identifies state 5 as the state before the performance deterioration rate of the virtual server VM2 exceeds the threshold "10%."

Then, the information processing apparatus 101 calculates the index value relating to the load state of the physical server PM1 in state 5 as the first index value. In the example of FIG. 4, the actual total number of virtual CPUs of the physical server PM1 in state 5 is "8 (=6+2)." Thus, the first index value is "8."

(System Configuration Example of Migration System 600)

Next, a system configuration example of a migration system 600 according to the embodiment will be described.

Figure 6:
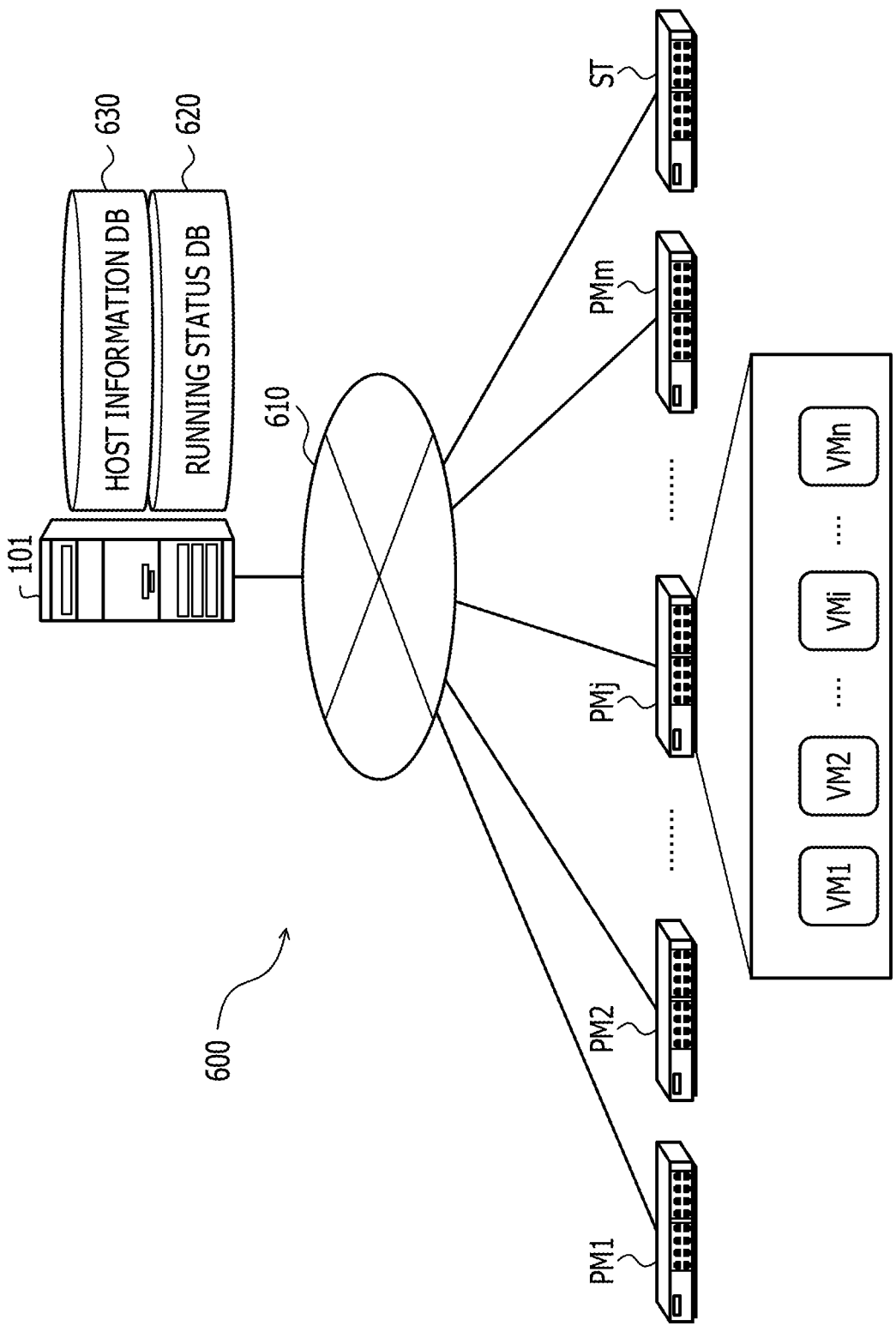
FIG. 6 is an explanatory diagram illustrating a system configuration example of a migration system.

FIG. 6 is an explanatory diagram illustrating the system configuration example of the migration system 600. In FIG. 6, the migration system 600 includes the information processing apparatus 101, physical servers PM1 to PMm (m: natural number substantially equal to or larger than two), and a standby server ST. In the migration system 600, the information processing apparatus 101, the physical servers PM1 to PMm, and the standby server ST are coupled mutually communicably through a network 610. The network 610 is a local area network (LAN), a wide area network (WAN), the Internet, or the like, for example.

In the following description, an arbitrary physical server in the physical servers PM1 to PMm will be represented as "physical server PMj" in some cases (j=1, 2, . . . , m). Alternatively, another physical server different from the physical server PMj in the physical servers PM1 to PMm will be represented as "physical server PMk" in some cases (k≠j, k=1, 2, . . . , m).

The information processing apparatus 101 includes a running status database (DB) 620 and a host information DB 630 and controls migration of a virtual server between physical servers. Stored contents of the running status DB 620 and the host information DB 630 will be described later by using FIG. 8 and FIG. 9.

The physical server PMj is a computer that may run an OS by a virtual server that works in an execution environment constructed by dividing hardware resources of the self-apparatus. The standby server ST is a dedicated physical server prepared as a migration destination in advance. Although only one standby server ST is represented in FIG. 6, the number of standby servers ST may be two or more.

In the following description, the virtual servers that work on the physical server PMj will be represented as "physical servers VM1 to VMn" in some cases (n: natural number substantially equal to or larger than two). Alternatively, an arbitrary virtual server in the virtual servers VM1 to VMn will be represented as "virtual server VMi" in some cases (i=1, 2, . . . , n).

Although the information processing apparatus 101 is disposed as a component separate from the physical servers PM1 to PMm here, the configuration is not limited thereto. For example, the information processing apparatus 101 may be implemented by the physical server PMj.

(Hardware Configuration Example of Information Processing Apparatus 101)

Figure 7:
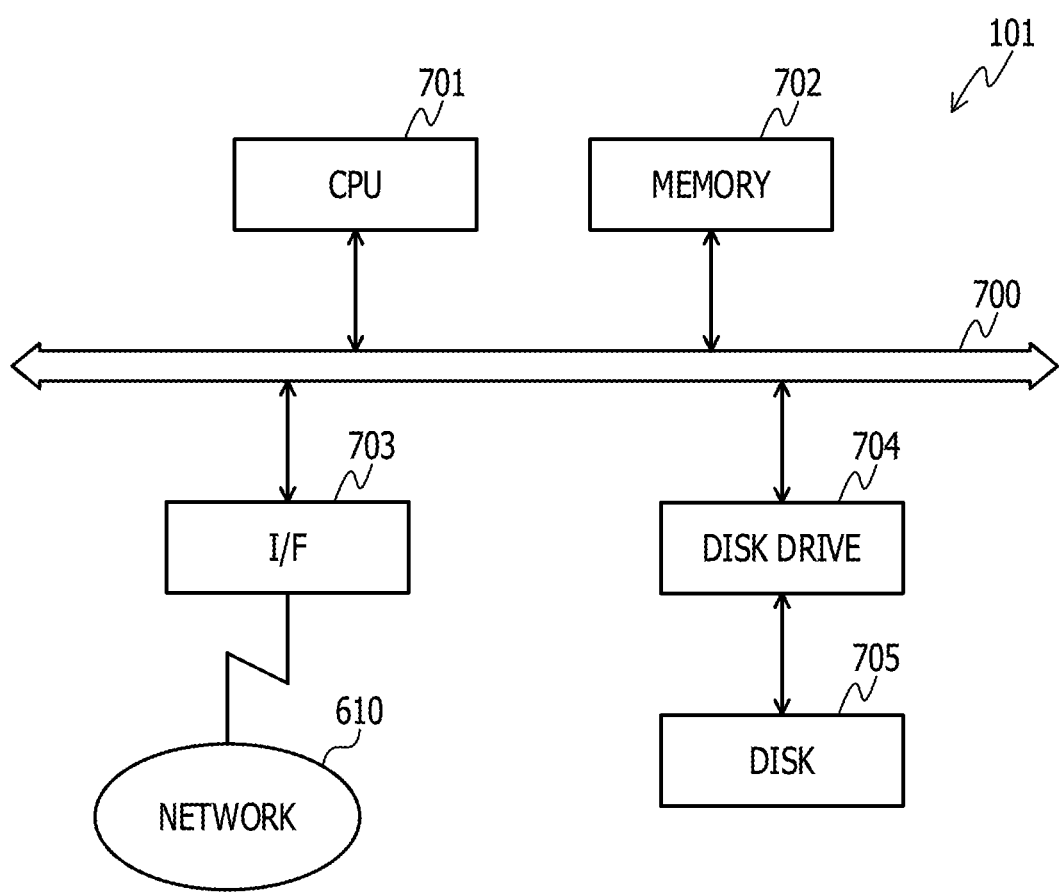
FIG. 7 is a block diagram illustrating a hardware configuration example of an information processing apparatus.

FIG. 7 is a block diagram illustrating a hardware configuration example of an information processing apparatus 101. In FIG. 7, the information processing apparatus 101 includes a CPU 701, a memory 702, an I/F 703, a disc drive 704, and a disc 705. The respective configuration units are each coupled by a bus 700.

Here, the CPU 701 is responsible for control of the whole of the information processing apparatus 101. The CPU 701 may include plural cores. The memory 702 includes read only memory (ROM), random access memory (RAM), flash ROM, and so forth, for example. Specifically, for example, the flash ROM stores a program of an operating system (OS), and the ROM stores an application program, and the RAM is used as a work area of the CPU 701. The program stored in the memory 702 is loaded by the CPU 701 and thereby causes the CPU 701 to execute coded processing.

The I/F 703 is coupled to the network 610 through a communication line and is coupled to external computers (for example, physical servers PM1 to PMm and standby server ST illustrated in FIG. 6) through the network 610. Furthermore, the I/F 703 is responsible for an interface between the network 610 and the inside of the apparatus and controls input and output of data from and to external computers. As the I/F 703, a modem, LAN adapter, or the like may be employed, for example.

The disc drive 704 controls reading/writing of data from/to the disc 705 in accordance with control by the CPU 701. The disc 705 stores data written by control by the disc drive 704. As the disc 705, magnetic disc, optical disc, and so forth are cited, for example.

The information processing apparatus 101 may include solid state drive (SSD), input apparatus, display, and so forth, for example, besides the above-described configuration units. The physical servers PM1 to PMm and the standby server ST illustrated in FIG. 6 may also be implemented by the same hardware configuration as the information processing apparatus 101.

(Stored Contents of Various DBs 620 and 630)

Next, stored contents of the various DBs 620 and 630 which the information processing apparatus 101 has will be described by using FIG. 8 and FIG. 9. The various DBs 620 and 630 are implemented by pieces of storing apparatus such as the memory 702 and the disc 705 illustrated in FIG. 7, for example.

FIG. 8 is an explanatory diagram illustrating one example of stored contents of a running status DB 620. In FIG. 8, the running status DB 620 includes fields of host name, virtual server name, flag, the number of vCPUs, CPU utilization, and time stamp and stores pieces of running status information (for example, pieces of running status information 800-1 to 800-10) as records by setting information in each field.

Here, the host name is an identifier to uniquely identify the physical server PMj. The virtual server name is an identifier to uniquely identify the virtual server VMi that works on the physical server PMj. The virtual server name "VMj-i" represents the virtual server VMi that works on the physical server PMj.

The flag is a flag that represents whether or not the corresponding virtual server is a virtual server excluded from the migration target. "1" or "0" is set as the flag. The flag "1" indicates that the corresponding virtual server is a virtual server excluded from the migration target. The flag "0" indicates that the corresponding virtual server is not a virtual server excluded from the migration target.

The number of vCPUs is the number of virtual CPUs allocated to the virtual server VMi. The CPU utilization is the utilization of the virtual CPUs allocated to the virtual server (unit: %). The time stamp represents the date and time when the CPU utilization has been measured.

For example, the running status information 800-1 represents the flag "1," the number "2" of vCPUs, the CPU utilization "100%," and the time stamp "2018/06/18 09:00:00" of the virtual server VM1 that works on the physical server PM1.

Figure 9:
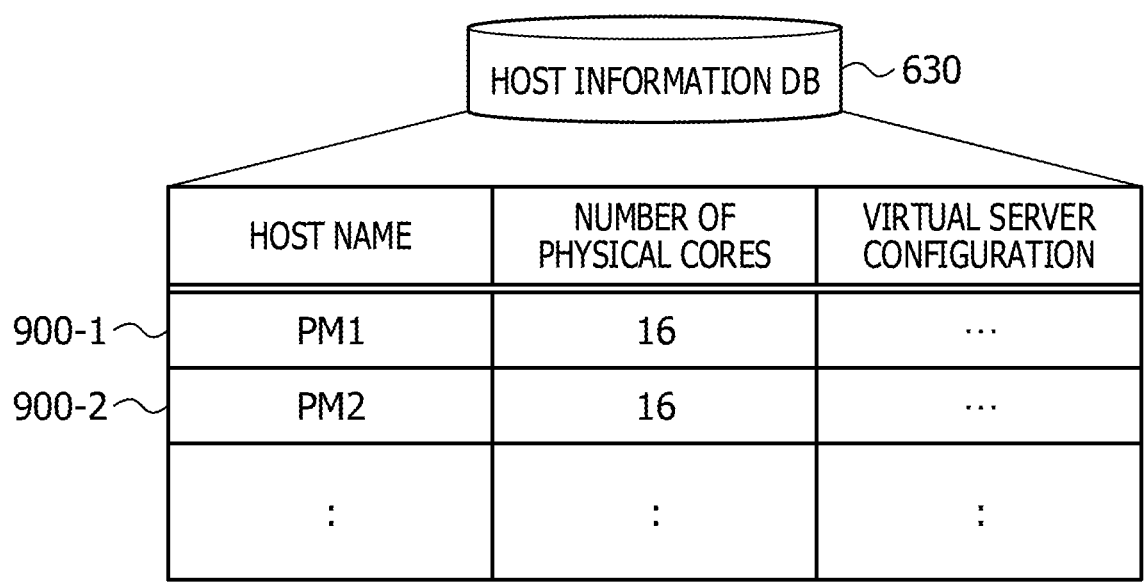
FIG. 9 is an explanatory diagram illustrating one example of stored contents of a host information DB.

FIG. 9 is an explanatory diagram illustrating one example of stored contents of a host information DB 630. In FIG. 9, the host information DB 630 includes fields of host name, the number of physical cores, and virtual server configuration and stores pieces of host information (for example, pieces of host information 900-1 and 900-2) as records by setting information in each field.

Here, the host name is an identifier to uniquely identify the physical server PMj. The number of physical cores is the number of physical cores (CPU cores) which the physical server PMj has. The virtual server configuration is configuration information relating to the virtual server caused to work on the physical server PMj. For example, the virtual server configuration includes the number of virtual servers, the number of vCPUs, information on the virtual server excluded from the migration target, and so forth. More specifically, for example, virtual server name, flag, the number of vCPUs, and so forth of the virtual server VMi that works on the physical server PMj may be included in the virtual server configuration. The flag is information that represents whether or not the corresponding virtual server is a virtual server excluded from the migration target.

(Functional Configuration Example of Information Processing Apparatus 101)

Figure 10:
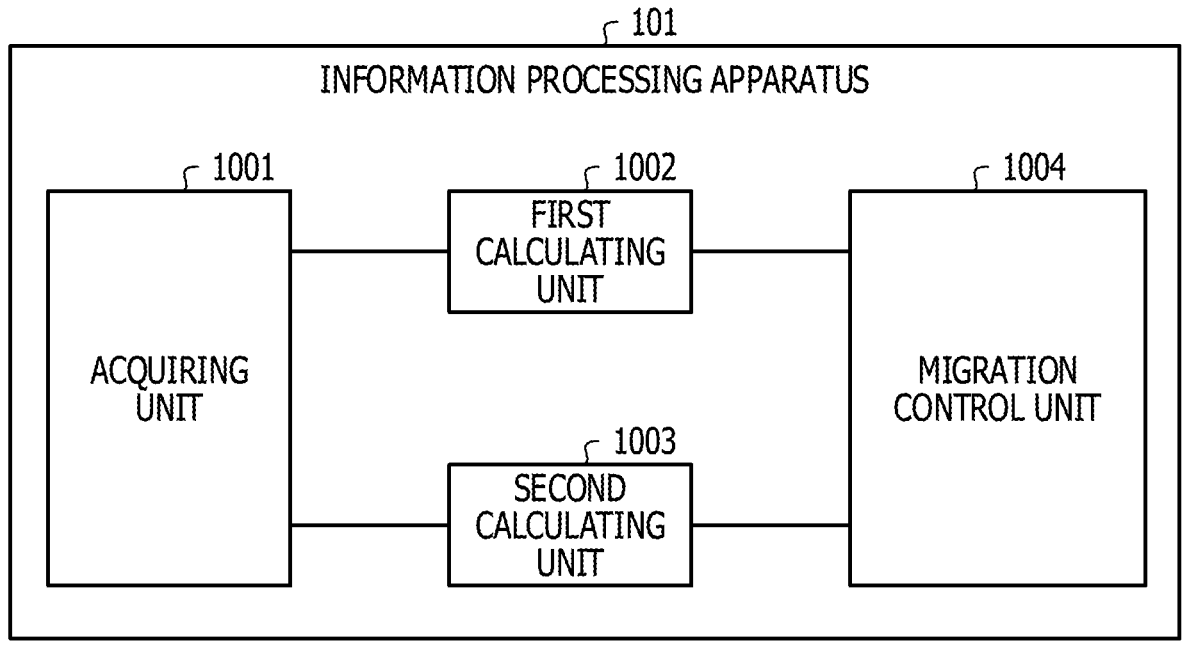
FIG. 10 is a block diagram illustrating a functional configuration example of an information processing apparatus.

FIG. 10 is a block diagram illustrating a functional configuration example of an information processing apparatus 101. In FIG. 10, the information processing apparatus 101 includes an acquiring unit 1001, a first calculating unit 1002, a second calculating unit 1003, and a migration control unit 1004. The acquiring unit 1001 to the migration control unit 1004 are functions that serve as a control unit. Specifically, for example, functions thereof are implemented by causing the CPU 701 to execute a program stored in storing apparatus such as the memory 702 or the disc 705 illustrated in FIG. 7 or by the I/F 703. The processing result of each functional unit is stored in storing apparatus such as the memory 702 or the disc 705. However, each functional unit of the information processing apparatus 101 may be implemented by plural computers in the migration system 600.

The acquiring unit 1001 acquires the host information. Here, the host information is information relating to the physical server PMj and includes the number of physical cores which the physical server PMj has, frequency, and so forth, for example. The host information includes configuration information relating to the virtual server caused to work on the physical server PMj, for example. Specifically, for example, the acquiring unit 1001 receives the host information from each of the physical servers PM1 to PMm and thereby acquires the received host information.

The acquired host information is stored in the host information DB 630 illustrated in FIG. 9, for example. The acquiring unit 1001 may acquire the host information through operation input by a user with use of input apparatus that is not illustrated. The user is the administrator of the migration system 600, for example.

The acquiring unit 1001 acquires virtual server information. Here, the virtual server information is information relating to the virtual server VMi that works on the physical server PMj. The virtual server information includes virtual server name, flag, the number of vCPUs, CPU utilization, and so forth of the virtual server VMi, for example. The flag represents whether or not the corresponding virtual server is a virtual server excluded from the migration target.

Specifically, for example, the acquiring unit 1001 receives the virtual server information of each virtual server VMi that works on the physical server PMj from the physical server PMj and thereby acquires the received virtual server information of each virtual server VMi. The processing of acquiring the virtual server information is periodically executed at a time interval of about several minutes, for example.

The acquired virtual server information is stored in the running status DB 620 illustrated in FIG. 8 in association with the host name and time stamp of the physical server PMj, for example. The date and time of the time stamp may be the date and time of reception of the virtual server information, for example.

The first calculating unit 1002 calculates the first index value relating to the load state of the physical server PMj before the performance deterioration rate of a specific virtual server in the virtual servers VM1 to VMn that work on the physical server PMj exceeds the threshold $\alpha$. Here, the specific virtual server is the virtual server excluded from the migration target.

Specifically, for example, first the first calculating unit 1002 identifies the performance deterioration rate of the specific virtual server when the utilization of the virtual server other than the specific virtual server in the virtual servers VM1 to VMn that work on the physical server PMj is changed in a stepwise manner. However, the case in which the physical server PMj is in the overcommit state is assumed.

More specifically, for example, the first calculating unit 1002 activates the virtual servers VM1 to VMn on the physical server PMj. Then, the first calculating unit 1002 measures the performance value of the specific virtual server when the utilization (CPU utilization) of the virtual server other than the specific virtual server in the virtual servers VM1 to VMn is changed in a stepwise manner. On this occasion, a fixed value may be employed as the utilization of the specific virtual server. The fixed value may be 100%, for example. Furthermore, the fixed value may be set in consideration of the running status at the time of operation of the specific virtual server.

The first calculating unit 1002 measures the absolute performance of the specific virtual server. For example, the first calculating unit 1002 measures the absolute performance of the specific virtual server by activating the specific virtual server solely on the physical server PMj and imposing a load to each virtual CPU allocated to the specific virtual server. The absolute performance of the virtual server is in such a relationship as to become higher as the number of virtual CPUs allocated to the virtual server increases.

Then, the first calculating unit 1002 identifies the performance deterioration rate of the specific virtual server by calculating the ratio of the measured performance value of the specific virtual server to the measured absolute performance of the specific virtual server. This may identify the performance deterioration rate of the specific virtual server when the utilization of the virtual server other than the specific virtual server is changed in a stepwise manner.

Next, the first calculating unit 1002 refers to the identified performance deterioration rate of the specific virtual server and calculates the first index value relating to the load state of the physical server PMj before the performance deterioration rate of the specific virtual server exceeds the threshold α. The first index value is an index that represents the load state of the physical server PMj with which the performance of the specific virtual server lowers and the performance deterioration rate of the specific virtual server exceeds the threshold α when any further load is applied to the physical server PMj.

In the following description, the first index value relating to the load state of the physical server PMj will be represented as "load threshold Lj of the physical server PMj" in some cases.

More specifically, for example, the first calculating unit 1002 identifies state change when the performance deterioration rate of the specific virtual server exceeds the threshold α in plural states obtained by raising the utilization of the virtual server other than the specific virtual server in a stepwise manner. Then, the first calculating unit 1002 calculates the index value relating to the load state of the physical server PMj in the state immediately before excess over the threshold α as the load threshold Lj of the physical server PMj.

Here, the index value relating to the load state of the physical server PMj may be the actual total number of virtual CPUs obtained by using the above-described expression (1), for example. As the index value relating to the load state of the physical server PMj, the value obtained by subtracting the nVM value ($nVM_{CPUutil}$) of the specific virtual server excluded from the migration target from the actual total number of virtual CPUs may be calculated. On this occasion, if plural virtual servers excluded from the migration target exist, the value obtained by subtracting the sum of the nVM values of the plural virtual servers excluded from the migration target from the actual total number of virtual CPUs may be employed as the index value relating to the load state of the physical server PMj.

This makes it possible to know in advance the load address Lj with which the performance of the specific virtual server is kept from deteriorating to an unacceptable degree based on the index expressed by the product of the number of vCPUs and the CPU utilization of each virtual server VMi on the physical server PMj.

Figure 11:
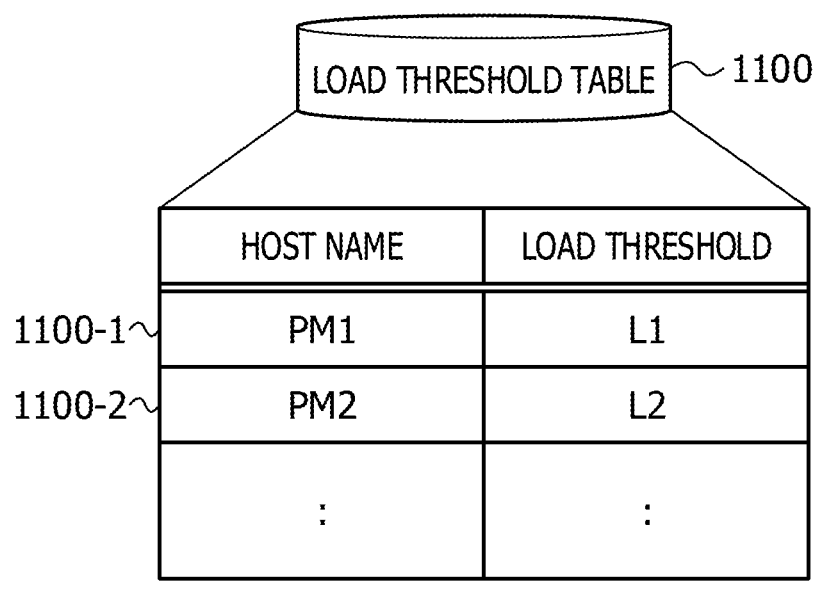

The calculated load threshold Lj of the physical server PMj is stored in a load threshold table 1100 illustrated in FIG. 11, for example. The load threshold table 1100 is implemented by storing apparatus such as the memory 702 or the disc 705.

FIG. 11 is an explanatory diagram illustrating one example of stored contents of a load threshold table 1100. In FIG. 11, the load threshold table 1100 includes fields of host name and load threshold and stores pieces of load threshold information (for example, pieces of load threshold information 1100-1 and 1100-2) as records by setting information in each field.

Here, the host name is an identifier to uniquely identify the physical server PMj. The load threshold is the first index value relating to the load state of the physical server PMj before the performance deterioration rate of the specific virtual server exceeds the threshold α. For example, the load threshold information 1100-1 represents a load threshold L1 of the physical server PM1.

The second calculating unit 1003 calculates the second index value relating to the load state of the physical server PMj while the specific virtual server is activated on the physical server PMj. Specifically, for example, the second calculating unit 1003 occasionally calculates the second index value relating to the load state of the physical server PMj based on the number of virtual CPUs allocated to each of the virtual servers VM1 to VMn that work on the physical server PMj and the utilization of the virtual CPUs.

For example, the actual total number of virtual CPUs obtained by using the above-described expression (1) is employed as the load threshold Lj (first index value) of the physical server PMj. In this case, the second calculating unit 1003 refers to the running status DB 620 illustrated in FIG. 8 and identifies the latest number of vCPUs and the latest CPU utilization of the respective virtual servers VM1 to VMn. Next, the second calculating unit 1003 calculates the present actual total number of virtual CPUs by using the above-described expression (1) based on the identified number of vCPUs and CPU utilization of the respective virtual servers VM1 to VMn. Then, the second calculating unit 1003 employs the calculated present actual total number of virtual CPUs as the second index value.

As the load threshold Lj (first index value) of the physical server PMj, the value obtained by subtracting the nVM value ($nVM_{CPUutil}$) of the specific virtual server excluded from the migration target from the actual total number of virtual CPUs obtained by using the above-described expression (1) is employed. In this case, the second calculating unit 1003 calculates the value obtained by subtracting the nVM value ($nVM_{CPUutil}$) of the specific virtual server from the calculated present actual total number of virtual CPUs as the second index value, for example.

The migration control unit 1004 determines whether or not the calculated second index value exceeds the calculated load threshold Lj (first index value) of the physical server PMj. The load threshold Lj of the physical server PMj is identified from the load threshold table 1100 illustrated in FIG. 11, for example. Here, if the second index value is substantially equal to or smaller than the load threshold Lj, the migration control unit 1004 does not carry out migration from the physical server PMj to another physical server.

On the other hand, if the second index value exceeds the load threshold Lj, the migration control unit 1004 carries out migration to another physical server for the virtual server VMi other than the specific virtual server in the virtual servers VM1 to VMn that work on the physical server PMj.

Specifically, for example, the migration control unit 1004 refers to the running status DB 620 and selects any virtual server VMi with the flag "0" in the virtual servers VM1 to VMn that work on the physical server PMj as the migration target. On this occasion, the migration control unit 1004 may select the virtual server VMi with the highest utilization (nVM=the number of vCPUs×CPU utilization) in the virtual servers with the flag "0" as the migration target, for example.

Then, the migration control unit 1004 carries out migration to another physical server for the selected virtual server VMi. On this occasion, the migration control unit 1004 may repeatedly select the migration target and carry out migration to another physical server so that the overcommit state of the physical server PMj may be resolved, for example.

Another physical server may be the standby server ST illustrated in FIG. 6, for example. The standby server ST is a dedicated physical server prepared as a migration destination in advance. For example, no virtual server is activated in the standby server ST in the initial state. Moreover, in the standby server ST, the utilization is limited so that the actual total number of virtual CPUs may be substantially equal to or smaller than a given value.

Another physical server may be the physical server PMk in which the utilization is lower than a threshold β in plural physical servers as candidates for the migration destination. The plural physical servers as the candidates for the migration destination are physical servers excluding the physical server PMj of the migration source in the physical servers PM1 to PMm, for example. The utilization of the physical server may be represented by the actual total number of virtual CPUs obtained by using the above-described expression (1), for example. Furthermore, the threshold β may be arbitrarily set and is set to a value about half the number of physical cores which the physical server has, for example.

If the utilization of the physical server PMj has become lower than the threshold β, the migration control unit 1004 may carry out migration to the physical server PMj for any virtual server on the standby server ST. This may raise the utilization through moving the virtual server on the standby server ST to the physical server PMj in which the actual total number of virtual CPUs is less than 50% of the number of physical cores, for example.

The second calculating unit 1003 may predict the utilization of the respective virtual servers VM1 to VMn that work on the physical server PMj after the elapse of a certain time t. Here, periodicity frequently appears in time change in the utilization of the virtual server VMi. For example, depending on how the virtual server VMi is used, periodicity appears in units of one day in some cases and appears in units of one week in other cases.

So, for example, the second calculating unit 1003 refers to the past running status of the virtual server VMi and identifies periodic time-series change in the utilization of the virtual server VMi. The past running status of the virtual server VMi is identified from the CPU utilization of the virtual server VMi in the running status DB 620, for example. Then, the second calculating unit 1003 predicts the utilization of the virtual server VMi after the elapse of the certain time t from the present timing based on the identified periodic time-series change in the utilization.

As techniques for predicting the utilization of the virtual server, it is possible to refer to "Energy-aware scheduling of virtual machines in heterogeneous cloud computing systems: Future Generating Computer Systems, vol 74. 2017," "Service Clustering for Autonomous Clouds Using Random Forest: CCGrid2015," "Virtual Machine Consolidation with Multiple Usage Prediction for Energy-Efficient Cloud Data Centers: IEEE Transactions on Services Computing, 2017," and so forth, for example.

Next, the second calculating unit 1003 may calculate a third index value relating to the load state of the physical server PMj after the elapse of the certain time t based on the predicted utilization of the respective virtual servers VM1 to VMn. The third index value is the actual total number of virtual CPUs after the elapse of the certain time t obtained by using the above-described expression (1), for example.

The migration control unit 1004 may determine whether or not the calculated third index value exceeds a threshold γ. Here, the third index value is the actual total number of virtual CPUs after the elapse of the certain time t, for example. The threshold γ may be arbitrarily set and is set to the number of physical cores which the physical server PMj has, for example. That the actual total number of virtual CPUs after the elapse of the certain time t exceeds the number of physical cores which the physical server PMj has means that a waiting time occurs due to CPU insufficiency after the elapse of the certain time t and the performance of the virtual server VMi that works on the physical server PMj lowers.

So, the migration control unit 1004 may carry out migration to another physical server for the virtual server VMi other than the specific virtual server if the calculated second index value exceeds the load threshold Lj of the physical server PMj and the calculated third index value exceeds the threshold γ.

Due to this, migration may be carried out if the present physical server PMj is in the state in which the performance deterioration rate of the specific virtual server exceeds the threshold α when any further load is applied and it is predicted that the load rises and performance deterioration occurs after the elapse of the certain time t.

The calculated third index value exceeds a limit value in some cases. Here, the limit value is an index value relating to the load state of the physical server PMj in the state in which the performance deterioration rate of the specific virtual server exceeds the threshold α in plural states obtained by changing the utilization of the virtual server other than the specific virtual server in a stepwise manner. In the example illustrated in FIG. 2, the limit value is equivalent to the index value relating to the load state of the physical server PM1 in state 3.

So, if the calculated third index value exceeds the limit value, the migration control unit 1004 may carry out migration to another physical server for the virtual server VMi other than the specific virtual server. Due to this, migration may be carried out if it is predicted that the performance deterioration rate of the specific virtual server exceeds the threshold α after the elapse of the certain time t.

(Operation Example of Migration System 600)

Next, an operation example of the migration system 600 will be described. Here, the case in which plural virtual servers excluded from the migration target exist on the physical server PMj is assumed.

FIG. 12 and FIG. 13 are explanatory diagrams illustrating a prediction example of running status of virtual servers. In FIG. 12, a state X represents the running status of virtual servers VM1 to VM10 that are working on the physical server PM1, identified from the pieces of running status information 800-1 to 800-10 represented in FIG. 8.

Here, the number of physical cores of the physical server PM1 is "16" (see FIG. 9). Furthermore, the sum of the numbers of vCPUs allocated to the virtual servers VM1 to VM10 on the physical server PM1 (the total number of virtual CPUs) is "20." Thus, the physical server PM1 is in the overcommit state.

The actual total number of virtual CPUs obtained by using the above-described expression (1) is employed as the second index value relating to the load state of the physical server PM1 in the state X. In this case, the second index value is "10.8." Thus, in the state X, although the physical server PM1 is in the overcommit state, "the actual total number of virtual CPUs (10.8)<the number of physical cores (16)" is satisfied and performance deterioration due to CPU insufficiency is not caused.

However, here suppose that the second index value "10.8" exceeds the load threshold L1 (first index value) of the physical server PM1. For example, it may be said that the physical server PM1 is in the state in which the performance deterioration rate of the virtual servers VM1 and VM6 with the flag "1" exceeds the threshold α when any further load is applied.

Here, to determine performance deterioration due to CPU insufficiency, an index of "the subject total number of vCPUs" obtained by subtracting the sum "4" of the numbers of vCPUs of the virtual servers VM1 and VM6 with the flag "1" from the number "16" of physical cores of the physical server PM1 is introduced. Here, the subject total number of vCPUs is "12."

In FIG. 13, a state Y represents a prediction result of the utilization (CPU utilization) of the virtual servers VM1 to VM10 after the elapse of ten minutes from the state X. Here, the value obtained by subtracting the nVM values of the virtual servers VM1 and VM6 with the flag "1" from the actual total number of virtual CPUs obtained by using the above-described expression (1) is employed as the third index value relating to the load state of the physical server PM1 in the state Y.

In this case, the third index value is "12.8 (=16.6−(2+1.8))." If this third index value exceeds the subject total number of vCPUs, it is predicted that performance deterioration occurs in the state Y obtained after the elapse of ten minutes from the state X. Here, "third index value (12.8)>the subject total number of vCPUs (12)" is satisfied and therefore it is predicted that performance deterioration occurs in the state Y obtained after the elapse of ten minutes from the state X.

From these facts, in the state X, the physical server PM1 is in the state in which the performance deterioration rate of the virtual servers VM1 and VM6 with the flag "1" exceeds the threshold α when any further load is applied, and is in the state in which the load rises and performance deterioration occurs after ten minutes. In this case, the information processing apparatus 101 carries out migration to another physical server for the virtual server other than the virtual servers VM1 and VM6 on the physical server PM1.

Figure 14:
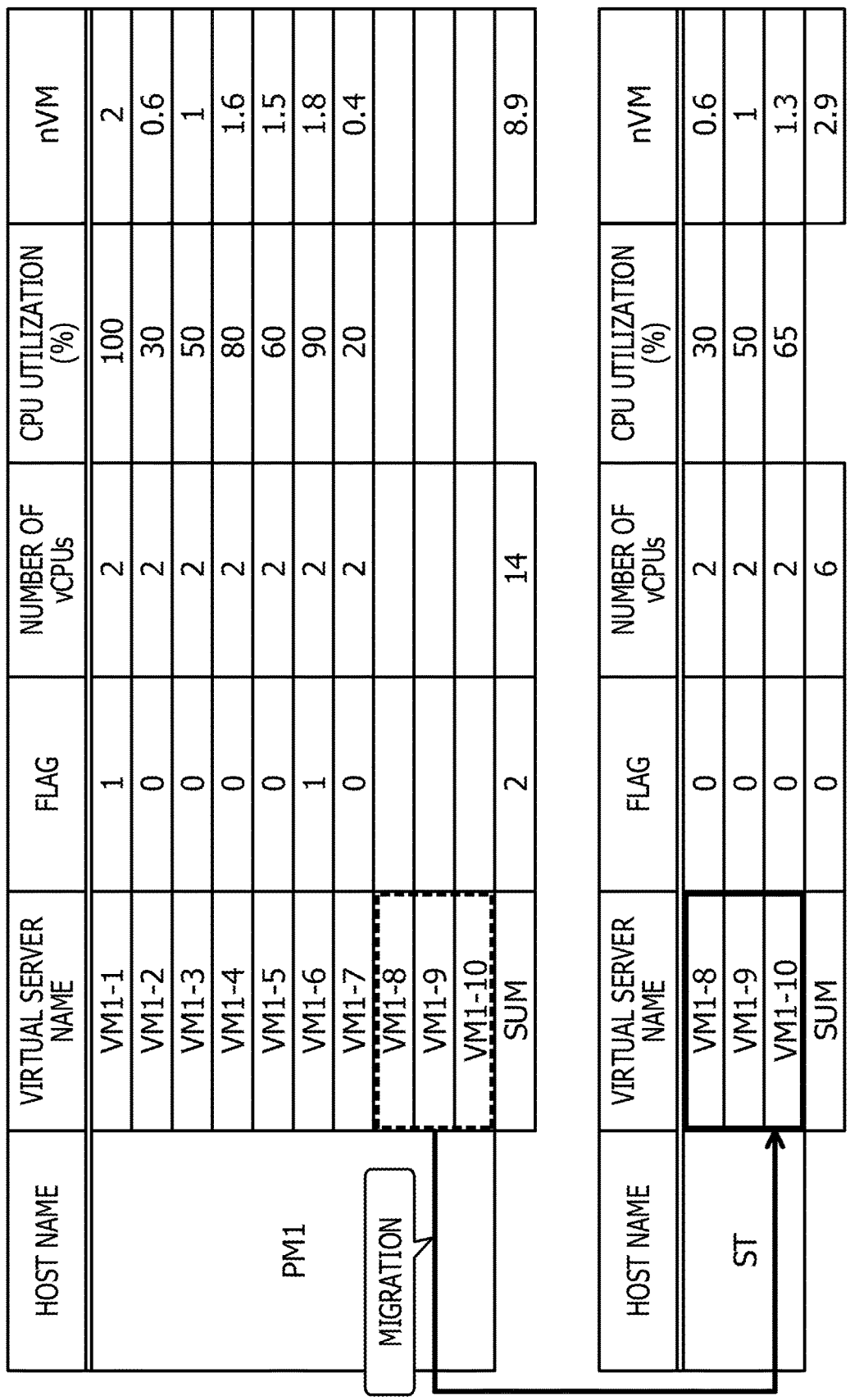
FIG. 14 is an explanatory diagram illustrating a migration example of virtual servers.

FIG. 14 is an explanatory diagram illustrating a migration example of virtual servers. Here, the case is assumed in which migration to the standby server ST is carried out for the virtual servers VM8 to VM10 other than the virtual servers VM1 and VM6 on the physical server PM1 so that the overcommit state of the physical server PM1 may be resolved.

In this case, the overcommit state of the physical server PM1 is resolved. For this reason, it may be said that, after the migration, the state in which the performance deterioration rate of the virtual servers VM1 and VM6 exceeds the threshold α in the immediate future may be avoided even when the second index value exceeds the load threshold L1 (first index value) of the physical server PM1.

(Migration Management Processing Procedure of Information Processing Apparatus 101)

Next, the migration management processing procedure of the information processing apparatus 101 will be described. Migration management processing of the information processing apparatus 101 is executed for each physical server PMj included in the physical servers PM1 to PMm, for example.

Figure 15:
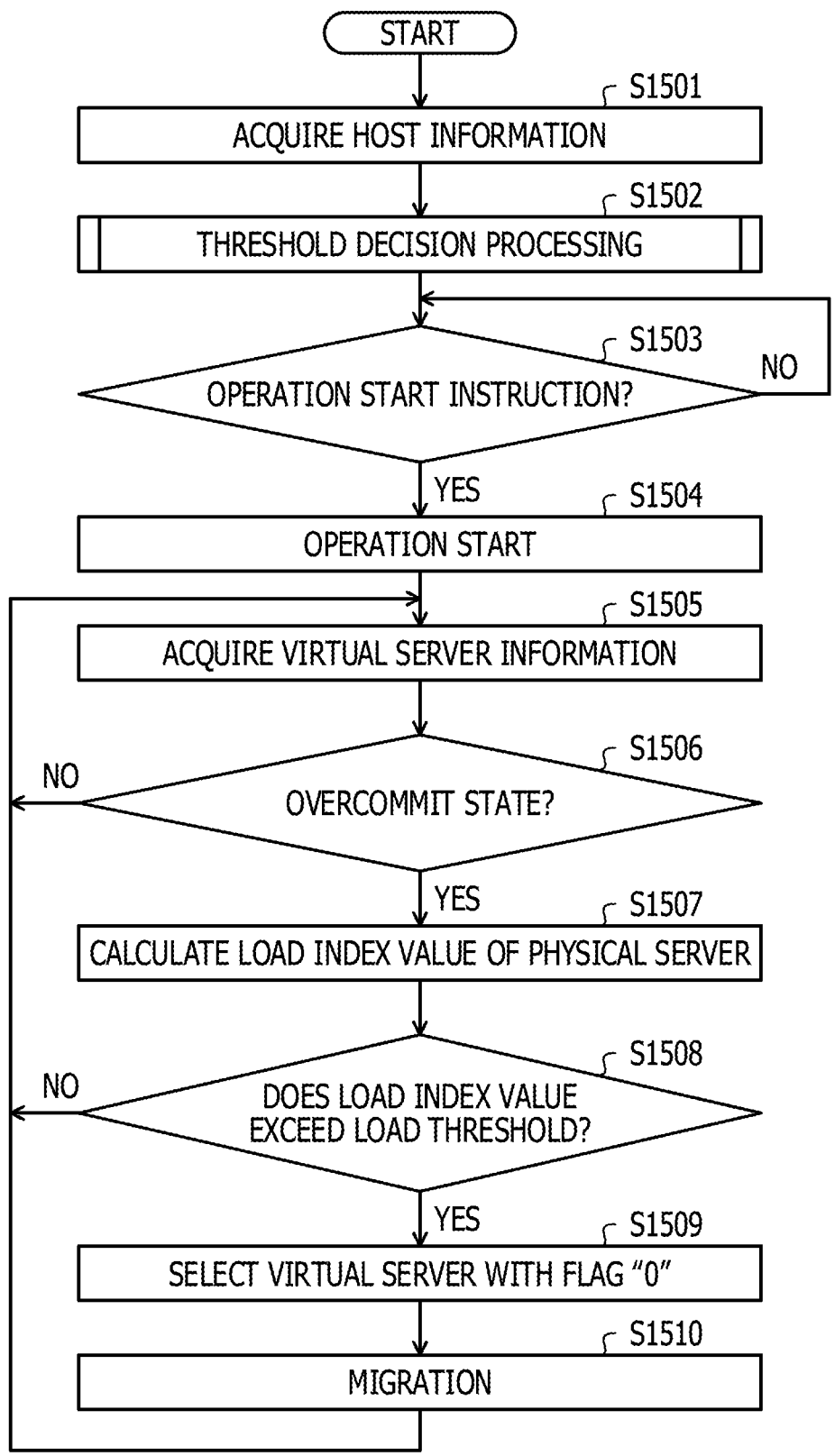
FIG. 15 is a flowchart illustrating one example of a migration management processing procedure of an information processing apparatus.

FIG. 15 is a flowchart illustrating one example of a migration management processing procedure of an information processing apparatus 101. In the flowchart of FIG. 15, first the information processing apparatus 101 acquires the host information of the physical server PMj (S1501). Next, the information processing apparatus 101 executes threshold decision processing of deciding the load threshold Lj of the physical server PMj (S1502).

Specific processing procedure of the threshold decision processing will be described later by using FIG. 16. Furthermore, when the execution of the threshold decision processing of S1502 is completed, the information processing apparatus 101 once ends execution of all virtual servers on the physical server PMj and becomes the state of waiting for start of operation, for example.

Next, the information processing apparatus 101 determines whether or not an operation start instruction of the physical server PMj has been issued (S1503). The operation start instruction of the physical server PMj is carried out by the administrator of the migration system 600, for example. Here, the information processing apparatus 101 waits for the operation start instruction of the physical server PMj (S1503: No).

Then, if the operation start instruction of the physical server PMj has been issued (S1503: Yes), the information processing apparatus 101 activates the virtual servers VM1 to VMn on the physical server PMj and starts operation of the virtual servers VM1 to VMn (S1504). Next, the information processing apparatus 101 acquires the virtual server information of each virtual server VMi that works on the physical server PMj from the physical server PMj (S1505).

Then, the information processing apparatus 101 determines whether or not the physical server PMj is in the overcommit state based on the acquired virtual server information of each virtual server VMi (S1506). Here, if the physical server PMj is not in the overcommit state (S1506: No), the information processing apparatus 101 returns to S1505. On this occasion, the information processing apparatus 101 may return to S1505 after waiting for a certain time (for example, five minutes).

On the other hand, if the physical server PMj is in the overcommit state (S1506: Yes), the information processing apparatus 101 calculates a load index value relating to the load state of the physical server PMj based on the acquired virtual server information of each virtual server VMi (S1507). The calculated load index value is equivalent to the above-described "second index value."

Then, the information processing apparatus 101 determines whether or not the calculated load index value of the physical server PMj exceeds the decided load threshold Lj of the physical server PMj (S1508). Here, if the load index value does not exceed the load threshold Lj (S1508: No), the information processing apparatus 101 returns to S1505. On this occasion, the information processing apparatus 101 may return to S1505 after waiting for a certain time.

On the other hand, if the load index value exceeds the load threshold Lj (S1508: Yes), the information processing apparatus 101 selects the virtual server VMi with the flag "0" based on the acquired virtual server information of each virtual server VMi (S1509). Then, the information processing apparatus 101 carries out migration to another physical server for the selected virtual server VMi (S1510) and returns to S1505.

This may suppress performance deterioration of the specific virtual server through migration of the virtual server other than the specific virtual server to another physical server at a timing before the performance of the specific virtual server deteriorates to an unacceptable degree.

Next, specific processing procedure of the threshold decision processing of S1502 represented in FIG. 15 will be described by using FIG. 16.

Figure 16:
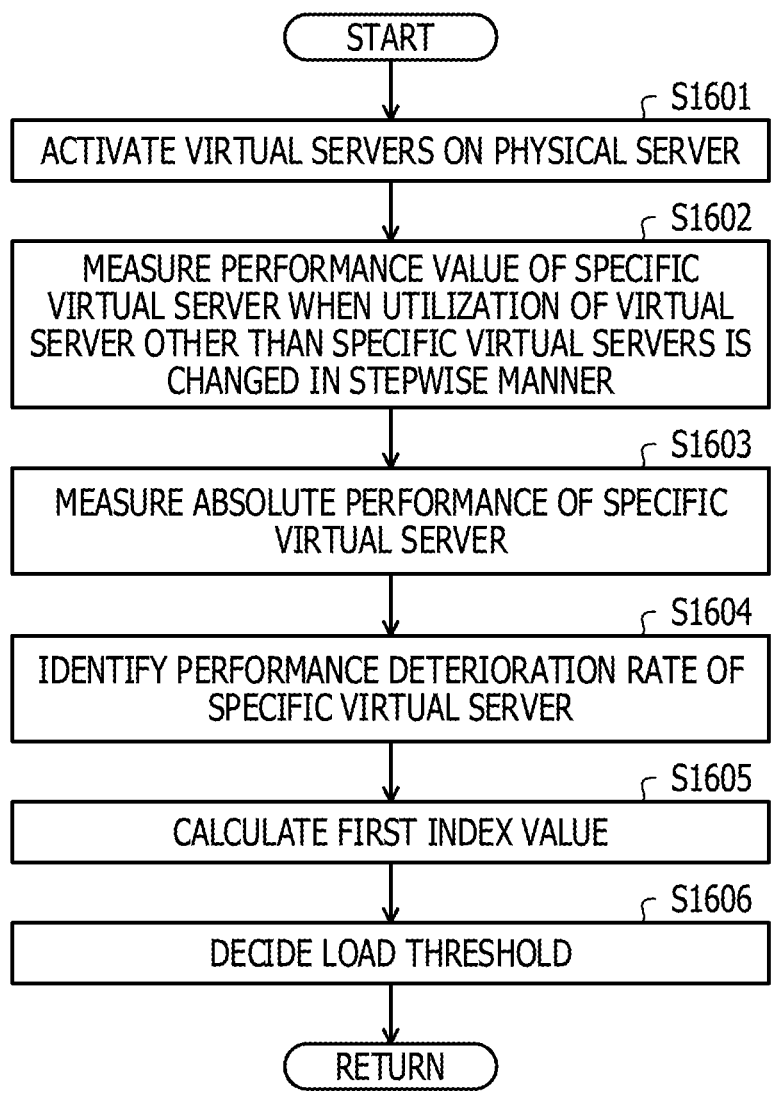
FIG. 16 is a flowchart illustrating one example of a specific processing procedure of threshold decision processing.

FIG. 16 is a flowchart illustrating one example of a specific processing procedure of the threshold decision processing. In the flowchart of FIG. 16, first the information processing apparatus 101 activates the virtual servers VM1 to VMn on the physical server PMj based on the acquired host information of the physical server PMj (S1601).

Next, the information processing apparatus 101 measures the performance value of the specific virtual server when the utilization of the virtual server other than the specific virtual server in the virtual servers VM1 to VMn on the physical server PMj is changed in a stepwise manner (S1602). The specific virtual server is the virtual server excluded from the migration target.

Next, the information processing apparatus 101 measures the absolute performance of the specific virtual server (S1603). The absolute performance of the specific virtual server is measured while the specific virtual server is solely activated or while the other virtual servers are all set to an idle state in the physical server PMj. Then, the information processing apparatus 101 identifies the performance deterioration rate of the specific virtual server by calculating the ratio of the measured performance value of the specific virtual server to the measured absolute performance of the specific virtual server (S1604).

Next, the information processing apparatus 101 refers to the identified performance deterioration rate of the specific virtual server and calculates the first index value relating to the load state of the physical server PMj before the performance deterioration rate of the specific virtual server exceeds the threshold $\alpha$ (S1605). Then, the information processing apparatus 101 decides the calculated first index value as the load threshold Lj of the physical server PMj (S1606) and returns to the step in which the threshold decision processing has been called.

Due to this, the index value that represents the load state of the physical server PMj when the performance deterioration rate of the specific virtual server exceeds the threshold $\alpha$ if any further load is applied to the physical server PMj may be decided as the load threshold Lj of the physical server PMj.

As described above, according to the information processing apparatus 101 in accordance with the embodiment, with reference to the performance deterioration rate of the specific virtual server when the utilization of the virtual server other than the specific virtual server in the virtual servers VM1 to VMn that work on the physical server PMj is changed in a stepwise manner, the first index value (load threshold Lj) relating to the load state of the physical server PMj before the performance deterioration rate of the specific virtual server exceeds the threshold $\alpha$ may be calculated based on the number of virtual CPUs allocated to each virtual server VMi and the utilization of the virtual CPUs. Furthermore, according to the information processing apparatus 101, the second index value relating to the load state of the physical server PMj may be calculated while the specific virtual server is activated on the physical server PMj. The calculation of the second index value is occasionally carried out (for example, at intervals of five minutes) while the specific virtual server is activated on the physical server PMj. Then, according to the information processing apparatus 101, if the calculated second index value exceeds the first index value, migration to another physical server may be carried out for the virtual server VMi other than the specific virtual server in the virtual servers VM1 to VMn that work on the physical server PMj.

This may suppress performance deterioration of the specific virtual server through migration of the virtual server other than the specific virtual server to another physical server at a timing before the performance of the specific virtual server deteriorates to an unacceptable degree. Furthermore, total optimization may be intended by load balancing by the migration between the physical servers.

According to the information processing apparatus 101, migration to the standby server ST prepared as a migration destination in advance may be carried out for the virtual server VMi other than the specific virtual server on the physical server PMj. This may alleviate the processing load and processing time taken for selection of the physical server that serves as the migration destination and smoothly carry out load balancing by the migration.

According to the information processing apparatus 101, if the utilization of the physical server PMj has become lower than the threshold $\beta$, migration to the physical server PMj may be carried out for any virtual server on the standby server ST. This may raise the utilization through moving the virtual server on the standby server ST to the physical server PMj in which the actual total number of virtual CPUs is less than 50% of the number of physical cores, for example.

According to the information processing apparatus 101, migration to the physical server PMk in which the utilization is lower than the threshold $\beta$ in the physical servers PM1 to PMm (excluding the physical server PMj) as candidates for the migration destination may be carried out for the virtual server VMi other than the specific virtual server on the physical server PMj. This may intend leveling of the load between physical servers in the physical servers PM1 to PMm.

According to the information processing apparatus 101, the utilization of each virtual server VMi after the elapse of the certain time t may be predicted with reference to the past running status of each virtual server VMi that works on the physical server PMj, and the third index value (for example, the actual total number of virtual CPUs) relating to the load state of the physical server PMj after the elapse of the certain time t may be calculated based on the predicted utilization of each virtual server VMi after the elapse of the certain time t. Furthermore, according to the information processing apparatus 101, migration may be carried out for the virtual server VMi other than the specific virtual server if the calculated second index value exceeds the first index value (load threshold Lj) and the calculated third index value exceeds the threshold $\gamma$ (for example, the number of physical cores).

Due to this, migration may be carried out if the present physical server PMj is in the state in which the performance deterioration rate of the specific virtual server exceeds the threshold $\alpha$ when any further load is applied and it is predicted that the load rises and performance deterioration occurs after the elapse of the certain time t.

From these facts, according to the migration system 600 in accordance with the embodiment, in carrying out load balancing by migration, the specific virtual server may be excluded from the migration target according to operator's or user's convenience or the like and performance deterioration of the specific virtual server may be suppressed.

The migration method described in the present embodiment may be implemented by executing a program prepared in advance by a computer such as a personal computer or work station. The present migration management program is recorded on a computer-readable recording medium such as a hard disk, flexible disc, compact disc (CD)-ROM, magneto-optical disk (MO), Digital versatile disk (DVD), or universal serial bus (USB) memory and is executed by being read out from the recording medium by a computer. Alternatively, the present migration management program may be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A migration management method executed by a computer, the migration management method comprising:
referring to a performance deterioration rate of a specific virtual server when utilization of a virtual server other than the specific virtual server in virtual servers that work on a physical server is changed in a stepwise manner, and calculating a first index value relating to a load state of the physical server before the performance deterioration rate of the specific virtual server exceeds a threshold based on a number of virtual CPUs allocated to each of the virtual servers that work on the physical server and utilization of the virtual CPUs;
calculating a second index value relating to the load state of the physical server based on the number of virtual CPUs allocated to each of the virtual servers that work on the physical server and the utilization of the virtual CPUs while the specific virtual server is activated on the physical server; and
conducting migration to another physical server for a virtual server other than the specific virtual server in the virtual servers that work on the physical server when the calculated second index value exceeds the calculated first index value.

2. The migration management method according to claim 1,
wherein the other physical server is a dedicated physical server prepared as a migration destination in advance.

3. The migration management method according to claim 2, further comprising:
conducting migration to the physical server for any virtual server on the other physical server when utilization of the physical server has become lower than a threshold.

4. The migration management method according to claim 1,
wherein the other physical server is a physical server in which utilization is lower than a threshold in a plurality of physical servers as candidates for a migration destination.

5. The migration management method according to claim 1, further comprising:
referring to a past running status of each of the virtual servers that work on the physical server and predicting utilization of each of the virtual servers after elapse of a certain time; and
calculating a third index value relating to the load state of the physical server after elapse of the certain time based on the predicted utilization of each of the virtual servers after elapse of the certain time,
wherein the conducting the migration includes conducting the migration when the calculated second index value exceeds the first index value and the calculated third index value exceeds a threshold.

6. The migration management method according to claim 1,
wherein the physical server is in a state in which a total number of virtual CPUs allocated to the virtual servers that work on the physical server exceeds the number of physical cores which the physical server has.

7. The migration management method according to claim 1,
wherein the load state of the physical server before the performance deterioration rate of the specific virtual server exceeds the threshold is the load state of the physical server in a state immediately before the performance deterioration rate of the specific virtual server exceeds the threshold in a plurality of states obtained by raising the utilization of the virtual server other than the specific virtual server in a stepwise manner.

8. The migration management method according to claim 1, wherein the calculating the second index value includes occasionally calculating the second index value relating to the load state of the physical server while the specific virtual server is activated on the physical server.

9. A non-transitory computer-readable storage medium storing a program that causes a processor included in a computer to execute a process, the process comprising:
referring to a performance deterioration rate of a specific virtual server when utilization of a virtual server other than the specific virtual server in virtual servers that work on a physical server is changed in a stepwise manner, and calculating a first index value relating to a load state of the physical server before the performance deterioration rate of the specific virtual server exceeds a threshold based on a number of virtual CPUs allocated to each of the virtual servers that work on the physical server and utilization of the virtual CPUs;
calculating a second index value relating to the load state of the physical server based on the number of virtual CPUs allocated to each of the virtual servers that work on the physical server and the utilization of the virtual CPUs while the specific virtual server is activated on the physical server; and
conducting migration to another physical server for a virtual server other than the specific virtual server in the virtual servers that work on the physical server when the calculated second index value exceeds the calculated first index value.

10. A migration system, comprising:
an information processing apparatus including a processor;
a plurality of physical servers coupled to the information processing apparatus; and
a standby server that is coupled to the information processing apparatus and is a dedicated physical server prepared as a migration destination in advance,
wherein the processor is configured to:
refer to a performance deterioration rate of a specific virtual server when utilization of a virtual server other than the specific virtual server in virtual servers that work on a physical server is changed in a stepwise manner, and calculate a first index value relating to a load state of the physical server before the performance deterioration rate of the specific virtual server exceeds a threshold based on a number of virtual CPUs allocated to each of the virtual servers that work on the physical server and utilization of the virtual CPUs;
calculate a second index value relating to the load state of the physical server based on the number of virtual CPUs allocated to each of the virtual servers that work on the physical server and the utilization of the virtual CPUs while the specific virtual server is activated on the physical server; and conduct migration to the standby server for a virtual server other than the specific virtual server in the virtual servers that work on the physical server when the calculated second index value exceeds the calculated first index value.

\* \* \* \* \*